(12) United States Patent
Will

(10) Patent No.: US 6,392,640 B1
(45) Date of Patent: May 21, 2002

(54) ENTRY OF WORDS WITH THUMBWHEEL BY DISAMBIGUATION

(75) Inventor: Craig Alexander Will, Long Barn, CA (US)

(73) Assignee: Cognitive Research & Design Corp., Mi Wuk Village, CA (US)

( * ) Notice: Subject to any disclaimer, the term of this patent is extended or adjusted under 35 U.S.C. 154(b) by 0 days.

(21) Appl. No.: 09/536,859

(22) Filed: Mar. 27, 2000

Related U.S. Application Data

(60) Continuation-in-part of application No. 09/175,142, filed on Oct. 19, 1998, now abandoned, which is a division of application No. 08/423,690, filed on Apr. 18, 1995, now Pat. No. 5,825,353.
(60) Provisional application No. 60/126,742, filed on Mar. 28, 1999.

(51) Int. Cl.[7] .................................................. G09G 5/00
(52) U.S. Cl. ......................... 345/184; 345/811; 345/816
(58) Field of Search ................................. 345/145, 146, 345/352, 184, 156, 157, 160, 162, 163, 167, 811, 810, 816, 841

(56) References Cited

U.S. PATENT DOCUMENTS 5,436,954 A * 7/1995 Nishiyama et al.
5,818,437 A * 10/1998 Grover et al. .............. 345/352
6,011,554 A * 1/2000 King ........................... 345/352
6,204,848 B1 * 3/2001 Nowlan et al. ............. 345/352

* cited by examiner

Primary Examiner—Regina Liang

(57) ABSTRACT

An improved method and apparatus for entering words with a menu and thumbwheel. A menu and thumbwheel is an effective user interface for certain specialized miniature information appliances, including personal digital assistants, two-way pagers, and handheld wireless Web access devices. However, entering text can be rather tedious. In the present invention, the average entry speed is increased by using menus in which each item contains more than one letter. The user enters the first few letters of a word ambiguously, with the system retrieving from a dictionary those words consistent with the letters and displaying them as part of the menu. When the user sees the desired word, that word is selected. The system can also learn which words a particular user is likely to enter, further speeding up entry. The approach is applicable to the entry of words to compose natural language text as well as the entry of names, electronic mail, and Web addresses for use with electronic mail, directory lookup, and Web browsing.

20 Claims, 24 Drawing Sheets

ENTRY OF WORDS WITH THUMBWHEEL BY DISAMBIGUATION

CROSS REFERENCE TO RELATED APPLICATIONS

The present application is related to and claims the benefit of the filing date of a U.S. provisional application Ser. No. 60/126,742 entitled "Entry of Text with Thumbwheel by Word Disambiguation", filed Mar. 28, 1999. The present application is also related to the following applications, all filed by Craig A. Will: "Control of Digital Watch Using Menu and Thumbwheel", filed May 31, 1994, Ser. No. 08/251,207, now U.S. Pat. No. 5,477,508, "Control of Miniature Personal Digital Assistant Using Menu and Thumbwheel", Ser. No. 08/423,690, filed Apr. 18, 1995, now U.S. Pat. No. 5,825,353 and "Control of Linguistic Communication Device with Menu and Thumbwheel", Ser. No. 09/175,142, filed Oct. 19, 1998 now abandoned. The present application is a continuation-in-part of application Ser. No. 09/175,142, which in turn is a division of application Ser. No. 08/423,690 filed Apr. 18, 1995 now U.S. Pat. No. 5,825,353. Application Ser. No. 08/423,690 and application Ser. No. 09/175,142 are both incorporated by reference into the present application.

FIELD OF THE INVENTION

The field of the invention relates to the entry of characters, including natural language text, into a computer, particularly a miniature handheld personal digital assistant. More specifically, it relates to a method for improving the efficiency of the entry of text and other character sequences when performed by a thumbwheel or other rotating cylinder by selecting ambiguous combinations of characters and then later disambiguating them to enter words.

BACKGROUND OF THE INVENTION

As electronic devices get smaller and become increasingly powerful and capable of operation with more flexibility (by, for example, wireless connection to the World Wide Web), there is an increasing need for ways of entering information into miniature handheld devices. Such devices include personal digital assistants, two-way pagers, Web browsers, and the like. They have been described as applying to various platforms, including wristwatches, credit card-sized personal digital assistants, and larger handheld devices such as MP3 music players.

One approach that has been taken is the use of a menu and thumbwheel for navigation of a small handheld device. As is described in the U.S. patent applications cited above, such an approach can be applied to a variety of different applications (e.g., address directories, operation of a telephone). The method has been used in a variety of devices, such as the Blackberry two-way pager manufactured by Research in Motion, Ltd. of Waterloo, Ontario, Canada. The approach can even be used to enter characters, either in the form of natural language text, names, or electronic mail addresses. Typically, the thumbwheel is combined with a switch arrangement such that when the thumbwheel is pressed in a direction perpendicular to the axis of rotation of the thumbwheel, the menu item that is currently designated (highlighted) is selected. However, the entry of characters with such an approach is tedious because of the need to scroll back and forth through a long display of potential characters in order to select the desired character. Since in most systems a mechanical stepping device is used to provide a distinctive "feel" (of variable resistance) of when the user has scrolled past a single item, this results in long sequences of "clicks" that a user must go through to locate a desired character. Since on the order of 26 to 30 or more characters are typically used for input, such entry is tedious indeed.

The thumbwheel is a very effective approach to navigation for a small handheld device, but there is a significant need for a way of entering text in a device too small for a keyboard. In particular, there is a need for a way of utilizing the thumbwheel more effectively to enter characters.

SUMMARY OF THE INVENTION

The goal of the invention disclosed here is to provide a capability of efficiently entering text using a miniature handheld device. The handheld device typically consists of a display, a thumbwheel or other rotating cylinder, a button or switch, a microprocessor for control, and a memory. The memory includes a database with a large number of words in a particular language, or names, or addresses, such as World Wide Web addresses.

In operation, a menu is displayed that prompts the user with a sequence of menu items. At any given time, one of the menu items is designated by displaying it in a manner different from the other items. This designation might be done by displaying it it reverse video, by drawing a rectangle around the item, or displaying a symbol, such as an arrow, next to the designated item. By rotating the thumbwheel in one direction or other, the designation is moved within the sequence in a particular direction. By pressing the button, the designated item is selected. Typically, a switch is incorporated within the thumbwheel assembly such that a movement of the thumbwheel sideways closes the switch, allowing the thumbwheel itself to serve as the selector button.

Alphabetic text is entered by selecting sequences of characters to form words. In the present invention, this is done in a particularly efficient manner by defining menu items such that each item contains two or more alphabetic letters. Thus, for example, the entire English A–Z alphabet might be represented by 9 menu items, with 8 of the items containing three letters each and the $9^{th}$ item containing two letters.

Users enter words by selecting a sequence of menu items that each contain the desired sequence of letters. After each selection of a menu item, words are retrieved from the memory that are consistent with the sequence entered so far. These words are added to the menu and displayed. When the user sees the word that is desired, he or she moves the thumbwheel so as to designate the desired word, and presses the button to cause it to be selected. The word is then entered.

On the average, the user must enter only a few keystrokes per word to enter it. In the case of words that are not contained in the memory, once the user enters sufficient keystrokes such that no words are retrieved, or selects a special memory item to request a full alphabetic keyboard, such a full alphabetic keyboard is provided, and the word is entered with one keystroke per letter.

The system is also applicable to the entry of electronic mail and Web addresses that contain special characters, in which case "letters" are not just the alphabet and "words" are not necessarily natural language words or names but any sequence of characters defined in the internal dictionary of the system.

The system is applicable to a variety of applications. In one application, that of a miniature personal digital assistant, the user enters notes in text in a credit card-sized device that contains the display, thumbwheel and button, and memory. A similar arrangement might also be used in a two-way pager, to allow responses to alphanumeric pages (short messages), or the creation of short messages, or a cellular telephone.

In the case of a pager, cellular telephone, or other wireless communication device, it is possible to put the memory and associated database of words in a remote server associated with the paging or cellular base station, to minimize memory requirements in the handheld unit itself. In such a system, the selection of menu items causes them to be transmitted to the server, the memory lookup done, and the results transmitted back to the handheld unit. Such a server might also be incorporated into a device such as a cordless telephone, particularly one that had the capability of responding to and/or composing electronic mail.

In still another embodiment, the handheld device might contain only the thumbwheel, selector switch or button, and a wireless transmitter. Such an embodiment might particularly be used in a remote control for a television that used an infrared transmitter in the handheld unit. The display and memory would be contained in the television receiver, which would also include an infrared receiver. This is of particular value in a television that included Internet capabilities, including electronic mail and Web browsing. The invention would allow efficient response to and composition of electronic mail messages and Web browsing by selection of alphabetic strings representing Web site addresses.

BRIEF DESCRIPTION OF THE DRAWINGS

FIG. 1A shows the system for composing text as used in a miniature personal digital assistant. FIG. 1B shows the state the system is in just after selection of the "KLMNO" item. FIG. 1C shows a display very similar to that for FIG. 1B, but with a different number of characters in each character group.

FIG. 4A is a front view of the PDA, showing a blowup beneath the outer packaging and the display in the area near the thumbwheel. FIG. 4B shows a side view (from the right side of the PDA package), including the movable frame 422, thumbwheel 423, shaft 424, and encoder 425. FIG. 4C is a front view of the PDA, showing a blowup beneath the outer packaging and the display in the area near the thumbwheel. FIG. 4D is a side view of the PDA, from the right side of the PDA package, including the movable frame 433, thumbwheel 434, shaft 435 that the thumbwheel rotates around, and shafts 436 and 437 that the thumbwheel is constrained by that provide the desired mechanical "feel".

FIG. 6A shows the device 601, display 602, and thumbwheel 603, while FIG. 6B shows the order that items are designated as the user rotates the thumbwheel in a clockwise direction. the character group inputs 604 and word inputs 605.

FIG. 12A shows the initial display screen for a method for editing accumulated text in the system for composing text., and so rotation in a clockwise fashion will move the designation in the text field to the left 1205, and, eventually, to the bottom of the window with retrieved words (which at the moment has no words displayed). FIG. 12B shows the next display screen in the sequence for the method for editing accumulated text in the system for composing text FIG. 12C shows another display screen for editing text.

FIG. 13A shows the overall organization of the data structure for one example word input case. FIG. 13B shows the data structures for the list of words for a particular context and for the dictionary of words.

DETAILED DESCRIPTION OF THE PREFERRED EMBODIMENTS

DEFINITIONS

Figure 1A:
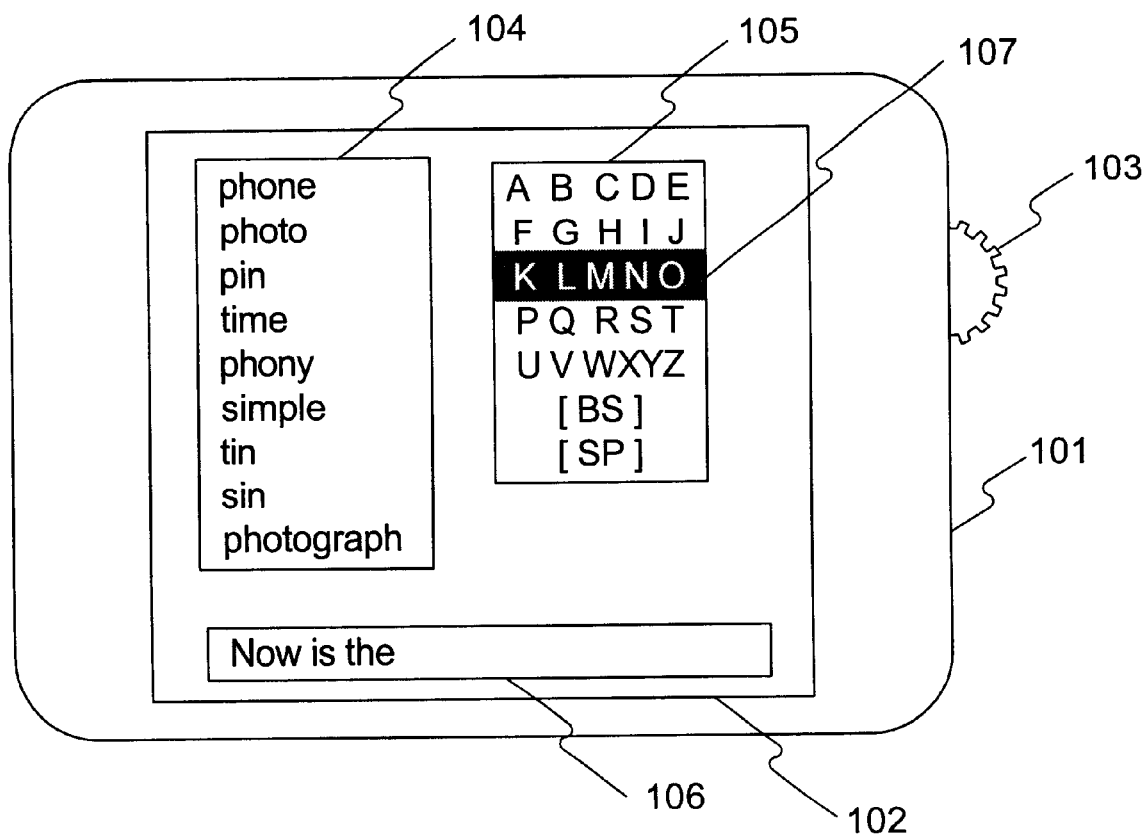
FIGS. 1A through 1C show how the system appears to the user.

A "character group" is a set of two or more character that, when selected, ambiguously describes a character contained in a word that a user intends to enter. A user selects a character group with the intention of selecting one of the letters contained in the character group. The character group may be displayed on a screen and selected by moving a designation to the character group and then selecting it by pressing a button or other means of closing a switch. It may be displayed on a touch-sensitive screen and selected by the user touching the screen. It may be associated with a key or button that, when pressed or touched, selects the character group. The character group remains ambiguous until either the intended word or a specific letter is selected by the user to resolve the ambiguity.

A "word" is any ordered sequence of characters followed by a delimiting character. Usually, the characters are letters of the alphabet, and, usually, the delimiting character is a space. In cases such as entry of an electronic mail address or Web address, a "word" may be defined as a complete such address, including such special characters as "@" (at sign), "." (period), ":" (colon), "/" (slash), "-" (dash), and the like. A word may represent meaning in a written language, or be the name or part of the name of an individual or other entity. It may also be an address, such as that of a Web site or electronic mail address.

"Text" is one or more words, usually (but not always) separated from each other by a space. Text usually refers to natural language text, but does not always.

A "letter" is any displayable character, although it usually refers to letters of the alphabet.

In this application, reference will be made to the entry and editing of text, words, and letters. For clarity, these terms will be used and the context of entering natural language text by defining natural words composed of letters of the alphabet will be assumed. However, it should be recognized that these descriptions are used to allow concreteness and easy understandability, and that the same discussion will usually apply to other applications in which text is not natural language, words do not have ordinary meaning, and letters are not letters of the alphabet.

An "item" is an entity contained in a list (usually an ordered sequence) of entities. Each entity has a displayable representation to allow display and selection of the item.

A "button" is any object that, when pressed, transmits an indication of such to a microprocessor.

A "cylinder" is an object that rotates about an axis, at least part of which has a relatively constant diameter as measured from the axis it rotates around to an outside surface that is touched by a human. The surface may be flat or may have features that enhance the grip or that otherwise improve the mechanical "feel" of the device. The cylinder may be hollow, or partly hollow. The cylinder may be a thumbwheel with the grip on the circumference of the cylinder, or the disk may be a jog-shuttle wheel with, for example, a depression on one of the ends of the cylinder that a finger may grab so as to rotate the cylinder.

A "disk" is a special case of a cylinder in which the measurement of length is substantially less than that of the diameter.

System as Seen By the User

FIG. 1A shows the system for composing text as used in a miniature personal digital assistant. In this device 101 a liquid crystal diode is used for a display 102, and a thumbwheel 103 serves as the sole input device. Rotating the thumbwheel 103 allows scrolling through menus and text, and pressing the thumbwheel 103 sideways allows it to also serve as a selector button. This device is the size of a credit card, and is typically used to enter, organize, and maintain names, addresses, and phone numbers, "to do" lists, and to take notes. The same method and device can also be used in conjunction with a two-way alphanumeric pager or other wireless communications device, with the method of particular value for creating a new message or sending a response to a received message.

The use of a thumbwheel rather than a set of keys for alphabetic entry is very valuable is such a small device, because it allows the limited surface of the packaging to be used for a display rather than keys. In addition, a miniature keyboard such as could be embodied in such a small device would be tedious and slow to use, and not necessarily better than the present device.

The display shows the device in the mode in which a word is being entered. This display is organized so as to have five menu items, with roughly five letters per item. (Four items have five letters, a fifth has six letters). Each such item is termed in this specification a "character group" according to the definitions provided above. The organization of the character groups is in terms of alphabetical order. The display is organized in two columns 104 and 105, plus a field across the bottom 106 to accumulate text. At the column at the right 105, a part of the menu is shown that presents characters to be entered. At the column at the left 104, words that have been retrieved from memory that are consistent with the sequence of menu selections that have been entered so far for this word are displayed. Note that one of the menu items 107 for (ambiguous) letter selection is designated as different from the remainder, in this case shown in reverse video. Alternately, the designation can involve drawing a rectangle (or other geographic shape) around the menu item or placing a symbol (such as an arrow) adjacent to the designated item.

The arrangement of the screen and the direction of movement within each column and field is designed so that the order of designation of items in the menus roughly approximates a circle. Thus, movement of the thumbwheel in a clockwise direction will cause the designation of a menu item (character group) in the right column (letters) to move up, cause the designation of a menu item in the left column (words to select) to move down, and the designation of a word in the text accumulation field to move to the left.

In the example shown, the user has previously entered the text "Now is the", and wishes to enter the word "time". The user moves the thumbwheel so as to move the designation to the right column, to the menu item containing the desired letter, in this case the "PQRST" item, and then presses the thumbwheel sideways so as to select it. The user then moves the designation to the "FGHIJ" item and selects it, and then to the "KLMNO" item and selects it.

Figure 1B:
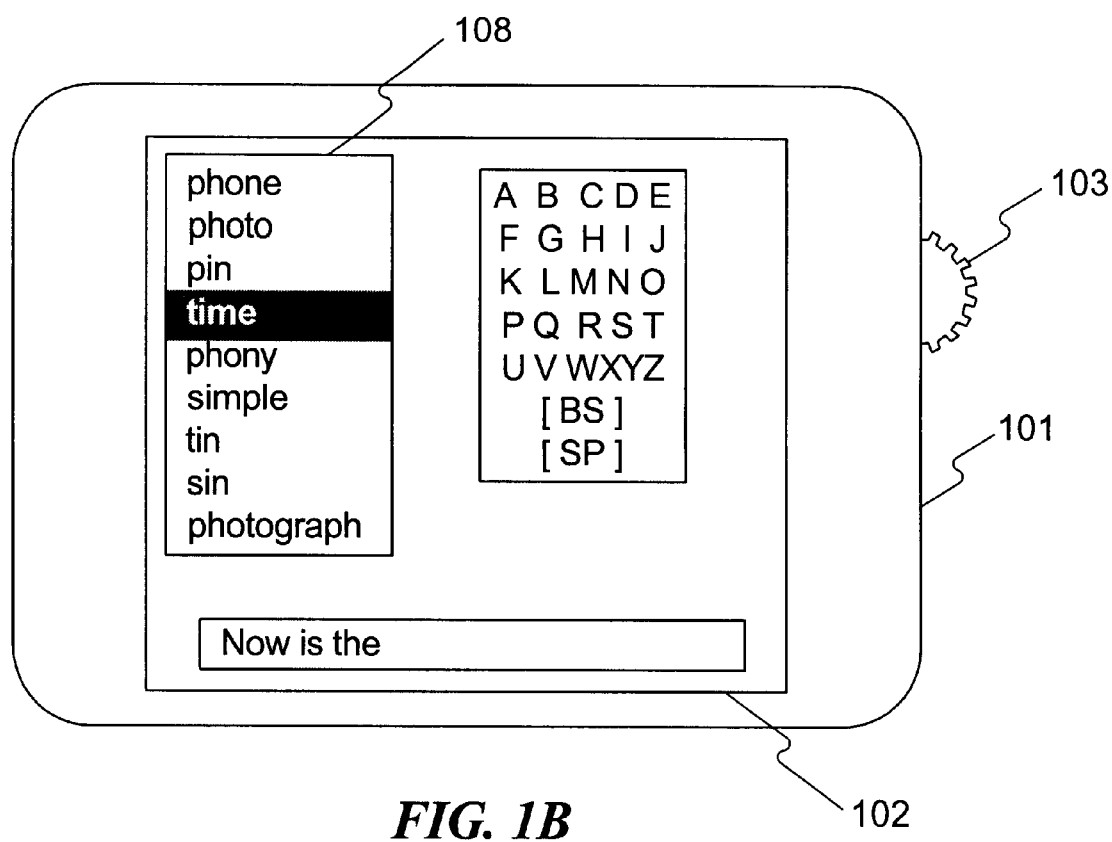

FIG. 1B shows the state the system is in just after selection of the "KLMNO" item. The system's memory is searched for those words in which the first three letters are consistent with the sequence of letters that have been selected, and displays them in the left column. (See below for a description of the decision tree mechanism allowing quick search of the memory allowing real-time display). The order of display is that of frequency of use in the English language (or other language, if not English). (The examples shown are for illustration are not necessarily in order of actual word frequency). The user then moves the thumbwheel and designation—by moving the thumbwheel counter-clockwise—to the left column 108. Note that because the first word encountered is the one at the top, the first word reached by the counter-clockwise rotation is the most likely word for the user to choose. The user moves the designation to the desired word and then selects it. Once the word is selected, it (and a following space) is added to the text shown in the text accumulation field. Once the end of the field has been reached by entered text, new text added will cause scrolling, with the earlier entered material disappearing to the left.

If desired, a specific indication can be provided that the entry of items has so far revealed any matches ("No Match"). This could be accompanied by items to allow a full alphabetic keyboard or imprecise matching, or selection of a specific dictionary (e.g., Web addresses, names) to search. Alternatively, selecting "No Match" could present a menu that includes these items.

If many words appear in the menu, the user can scroll through the words if desired to find it. Alternatively, the user can continue to enter letter menu items until either the desired word appears or it becomes clear that the word is not in the dictionary. In the latter case, the user should select the full alphabetic keyboard option to enter the word.

If the list of scrollable words is very long, the user can select a menu item that puts the list into alphabetical order, with a hierarchical organization that allows the user to navigate through the list. Alternatively, the user can at the same time elect to see all of the words in the memory, or to expand the current list of words by a matching mechanism that takes into account the fact that the user may have made an error in entering the word or may be unable to spell it. Such full or expanded lists are often more easily searched by a hierarchical organization, based on the alphabet. The user can also choose a menu item to enter via a full alphabetic keyboard. Typically, although not shown, one of the items in the menu of words is a selection for a full alphabetic keyboard.

In the example shown, the thumbwheel itself does not necessarily have to be used for selection. Instead, the thumbwheel can be used for rotation only, with selection accomplished by pressing another key. This is shown in U.S. Pat. No. 5,825,353, which is fully incorporated by reference. With the device shown, it is possible to rotate the thumbwheel with the thumb of the hand holding the device, for example, while the other hand is available for pressing a key. In addition, additional keys can be used for frequently-selected items, such as switching to a different mode to allow alternative options, such as editing the accumulated text or creating input from a full alphabetic keyboard. A particularly desirable configuration is the use of the thumbwheel for selection, with a single key available to be pressed to change the mode of operation of the device.

If the user makes an error, selecting the "BS" (Backspace) item will place the system in the state it was in before entry of the last item containing letters. When the user complete entering an entire word (if the user has not found the word and selected it before this occurs), the user selects the "SP" (Space) item will indicate to the system the end of the word, which will allow it to reduce the number of words displayed by only retrieving words of a known length.

Other menu items, below the "BS" and "SP" but reachable by scrolling, allow input from a full alphabetic keyboard, for words or names or other items that are not in the memory. They also also entry into an edit mode, in which the user can edit the text in the text accumulation field. Finally, a menu item, not shown, allows exit out of the composition mode back to the calling application.

Figure 1C:
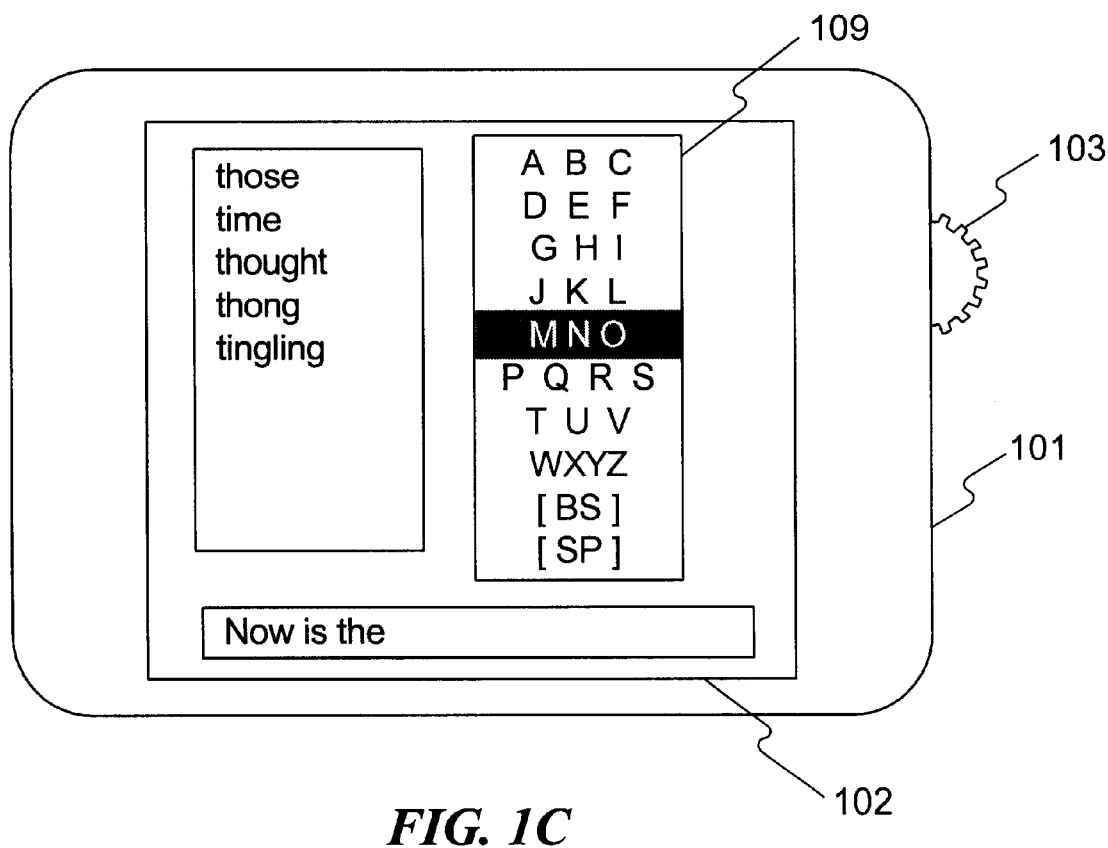

FIG. 1C shows a display very similar to that for FIG. 1B, but with a different number of characters in each character group. The window 109 showing the character groups shows three characters per group. The display shows the state the system is in just after entry of the "TUV" and "GHI" character groups.

Hardware Architecture

Figure 2:
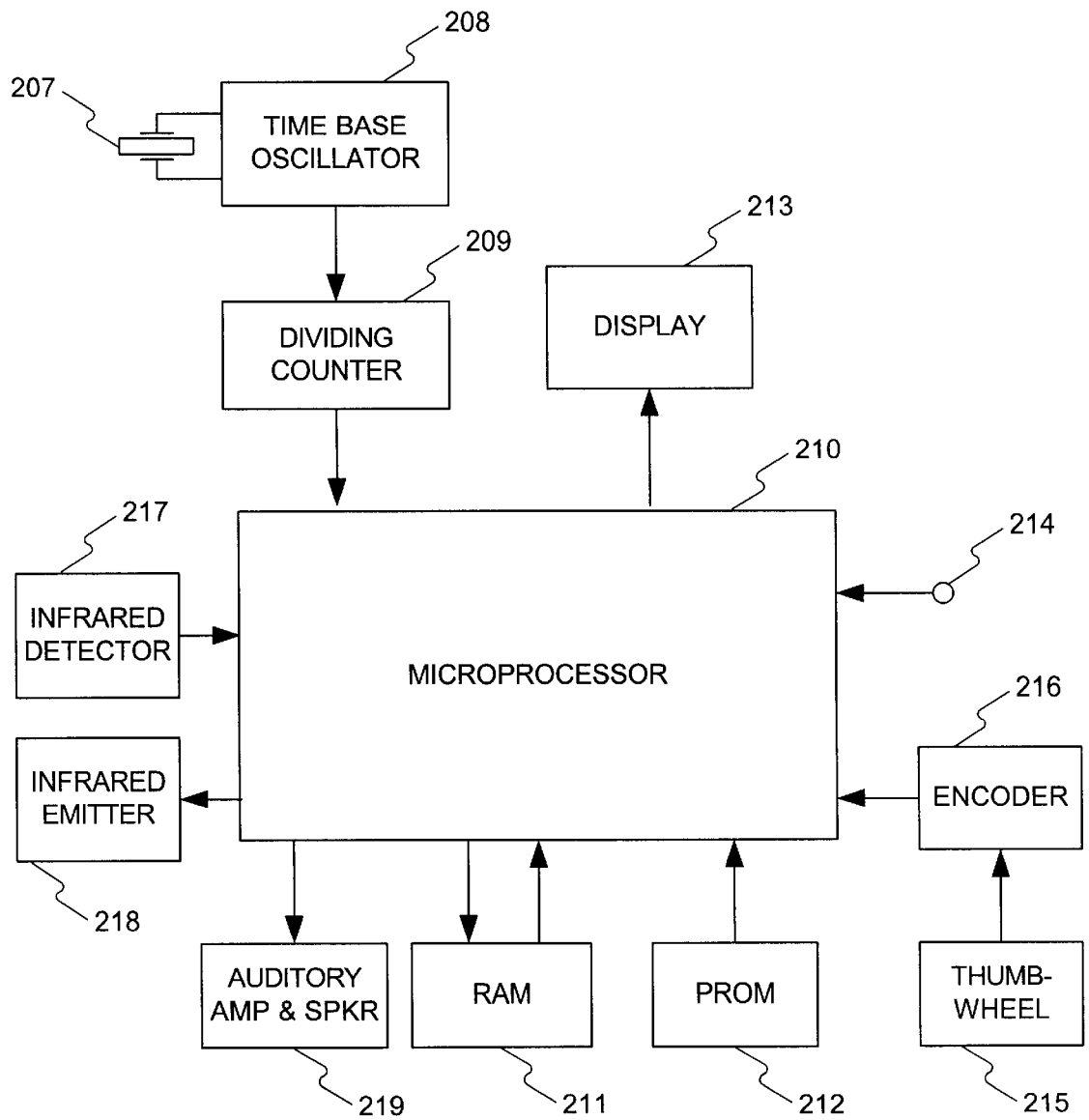
FIG. 2 shows the hardware architecture for the personal digital assistant.

FIG. 2 shows the hardware architecture for the personal digital assistant. A crystal 207 and associated time base oscillator 8 produces a sequence of pulses driving a frequency dividing counter 209 with a 76.8 kHz output frequency. The pulse stream is read into the microprocessor 210, via a program interrupt, which uses this information to update software counters kept in random access memory 211 (RAM) that control all timing functions, and to control infrared communications. The software program controlling the microprocessor 210 is contained in a programmable read only memory 212 (PROM). A display 213 contains a memory, address logic, display drivers, and optoelectronics for display of the characters and other symbols, in the form of binary pixels. A thumbwheel 215 or rotating cylinder operated by the user's thumb or finger is moved by the user when desired, and as it is moved an encoder 216 generates pulses that are transmitted to the microprocessor 210. The encoder coverts rotation of the thumbwheel, which is connected to a shaft, to pulses that encode angular movement. The shaft might, for example, be connected to a disk with holes (often slits) arranged in a circle, spaced at equal intervals. A light source, such as a light emitting diode, is positioned at a fixed point on one side of the disk while a light sensor, such as a photosensitive diode, is positioned at the other side of the disk. Interruptions of the light as it is passed or blocked by the holes in or solid parts of the disk result in the pulses. A pair of photosensitive diodes spaced appropriately allows both the detection of movement and its direction (by determining which pulse is first). A selector button 214, when pressed by the user, transmits a signal to the microprocessor. An infrared detector 217 senses infrared energy from a connection with a network interface for receiving data (and acknowledgements) and an infrared emitter 218 transmits data to a network interface (and receives acknowledgements). (Alternatively, radio can be used, including a radio receiver instead of infrared detector 217 and a radio transmitter instead of infrared emitter 218.) An audio amplifier and speaker 219 allows "beep" signals to be generated. The auditory amplifier can also be used to automatically dial a telephone (though the handset microphone) when the number has been retrieved from a telephone directory, if that application is included in the unit. Note that the infrared detector and emitter (or radio equivalent) are optional, used only if it is desired to access information from a remote source, such as an accompanying memory device (e.g., PC with hard drive or CD-ROM), or from a connection to the Internet.

Figure 3:
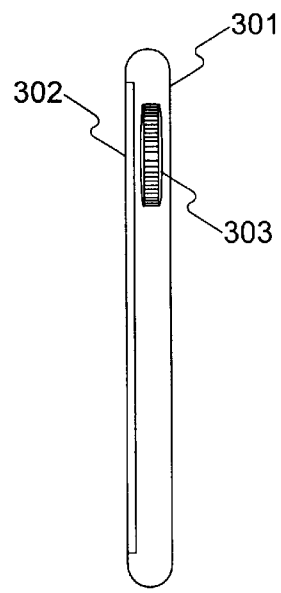
FIG. 3 shows a side view of the personal digital assistant packaging with a thumbwheel that simultaneously serves as a selector button.

FIG. 3 shows a side view of the personal digital assistant packaging with a thumbwheel that simultaneously serves as a selector button. The package 301 contains a display 302 and only one control device, the thumbwheel 303. This is convenient for the user because the user can move the thumbwheel and select the result in a single motion, and is also potentially more accurate than using a separate button that may require the user to take his or her thumb or finger off of the thumbwheel (and risk disturbing its position) to press a button elsewhere on the PDA.

Figure 4A:
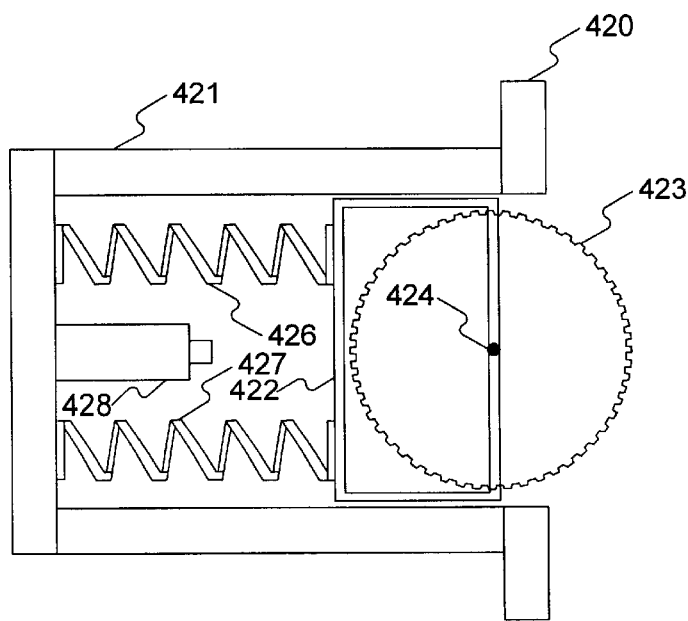
FIGS. 4A and 4B show details of the user interface in which the thumbwheel serves as a selector button.
Figure 4B:
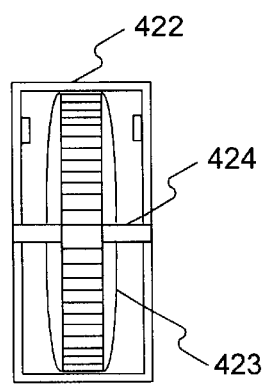

FIGS. 4A and 4B show details of the user interface in which the thumbwheel serves as a selector button. FIG. 4A is a front view of the PDA, showing a blowup beneath the outer packaging and the display in the area near the thumbwheel. The right side of the package 420 contains a fixed frame 421. Within this frame a second movable frame 422, or box, is constructed that contains the thumbwheel 423, with a shaft 424 connecting the thumbwheel to the frame, but sufficiently loosely that the thumbwheel can rotate. FIG. 4*b* shows a side view (from the right side of the PDA package), including the movable frame 422, thumbwheel 423, shaft 424, and encoder 425. The encoder is in two parts, a piece attached to the shaft that rotates with the thumbwheel, and a pair of nonrotating pieces that receive and process the pulses. The rotating piece, for example, can be a disk with holes or slits in it (not shown), and the nonrotating pieces (attached to the movable frame) a light source and photosensitive diode and associated logic, respectively, attached to opposite sides of the disk, with the nonrotating pieces connected by flexible wires (not shown) to the PDA case and microprocessor. As is seen in the front view, when the user has completed rotating the thumbwheel 423 and presses it toward the left (perpendicular to the PDA packaging), the movable frame 422 moves toward the fixed frame 421. The movement is resisted by springs 426 and 427, but, with sufficient force, the frame will move so as to press the switch 428.

Figure 4C:
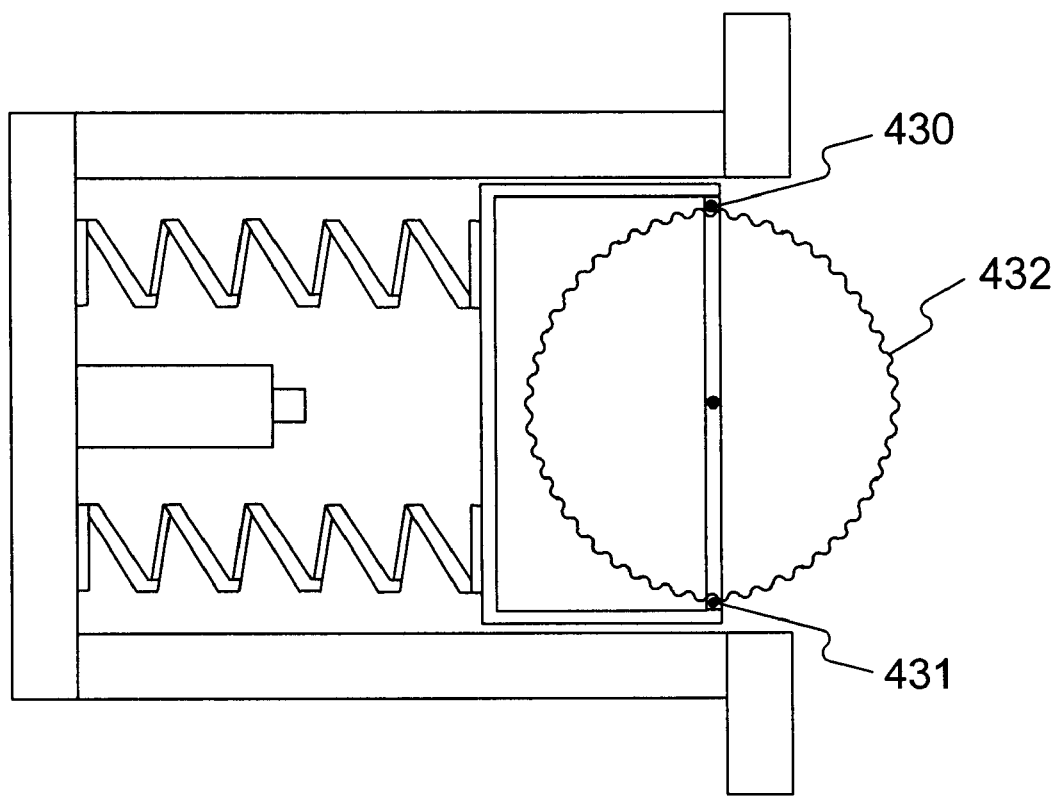
FIGS. 4C and 4D show details of an alternative embodiment of the user interface in which the thumbwheel servers as a selector button.
Figure 4D:
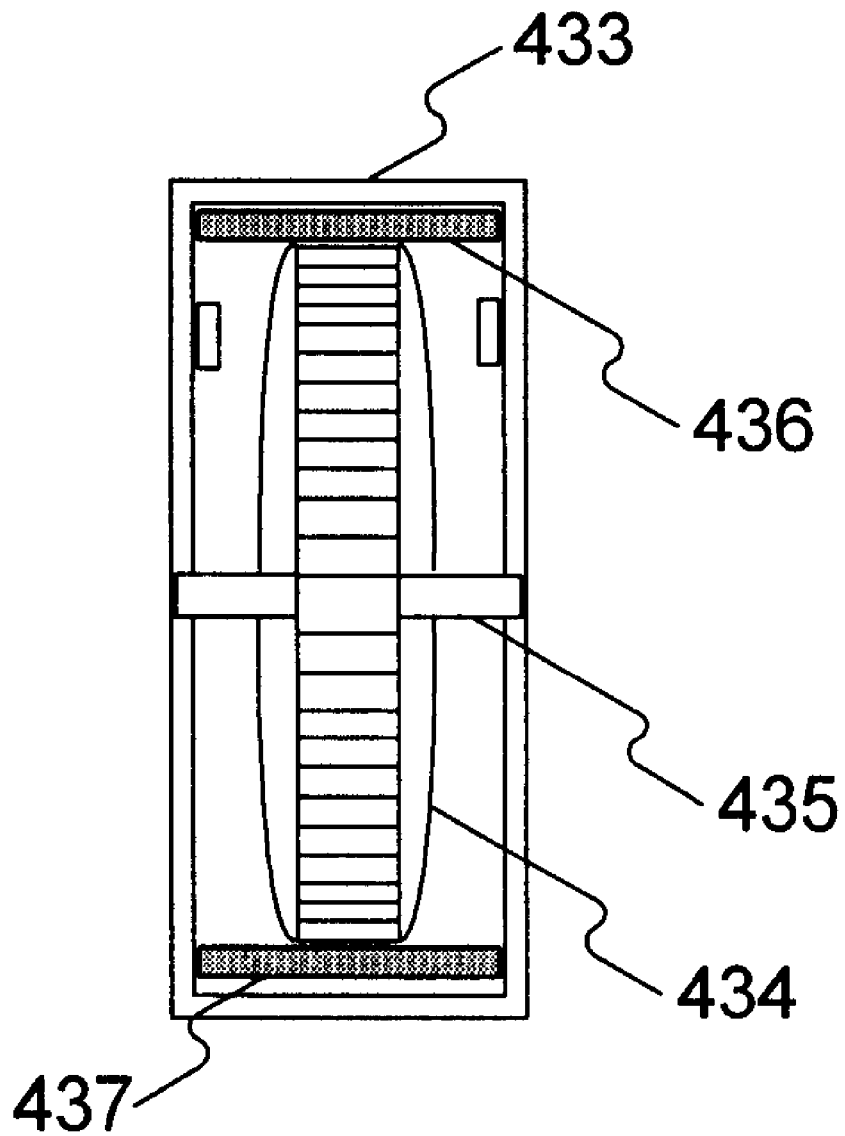

FIGS. 4C and 4D show details of an alternative embodiment of the user interface in which the thumbwheel servers as a selector button. FIG. 4C is a front view of the PDA, showing a blowup beneath the outer packaging and the display in the area near the thumbwheel. This system is the same as in FIG. 4A, except that the movable frame contains two additional shafts 430 and 431, the disk 432 is somewhat smaller in diameter with respect to the frame, and the disk 432 is specifically designed with a surface (as felt by the user) that is composed of alternating concave and convex semicircles. In addition, although not shown, there are the same number of slits (or an integral multiple of this number) as there are sequences of alternating semicircles, and these slits and sequences are synchronized appropriately. The combination of these results in a mechanical "feel" that tends to force the thumbwheel to discrete positions that are then synchronized with menu items. This makes it easy for a user to "feel" how many menu items are being passed and to avoid making mistakes by selecting a menu item adjacent to that desired because of the thumbwheel being positioned too closely to that item. All of the existing products on the market that make use of a menu and thumbwheel display appear to use a mechanical linkage with similar goals, although the mechanisms are different. FIG. 4D is a side view of the PDA, from the right side of the PDA package, including the movable frame 433, thumbwheel 434, shaft 435 that the thumbwheel rotates around, and shafts 436 and 437 that the thumbwheel is constrained by that provide the desired mechanical "feel".

Alternative Display Organizations

Figure 5:
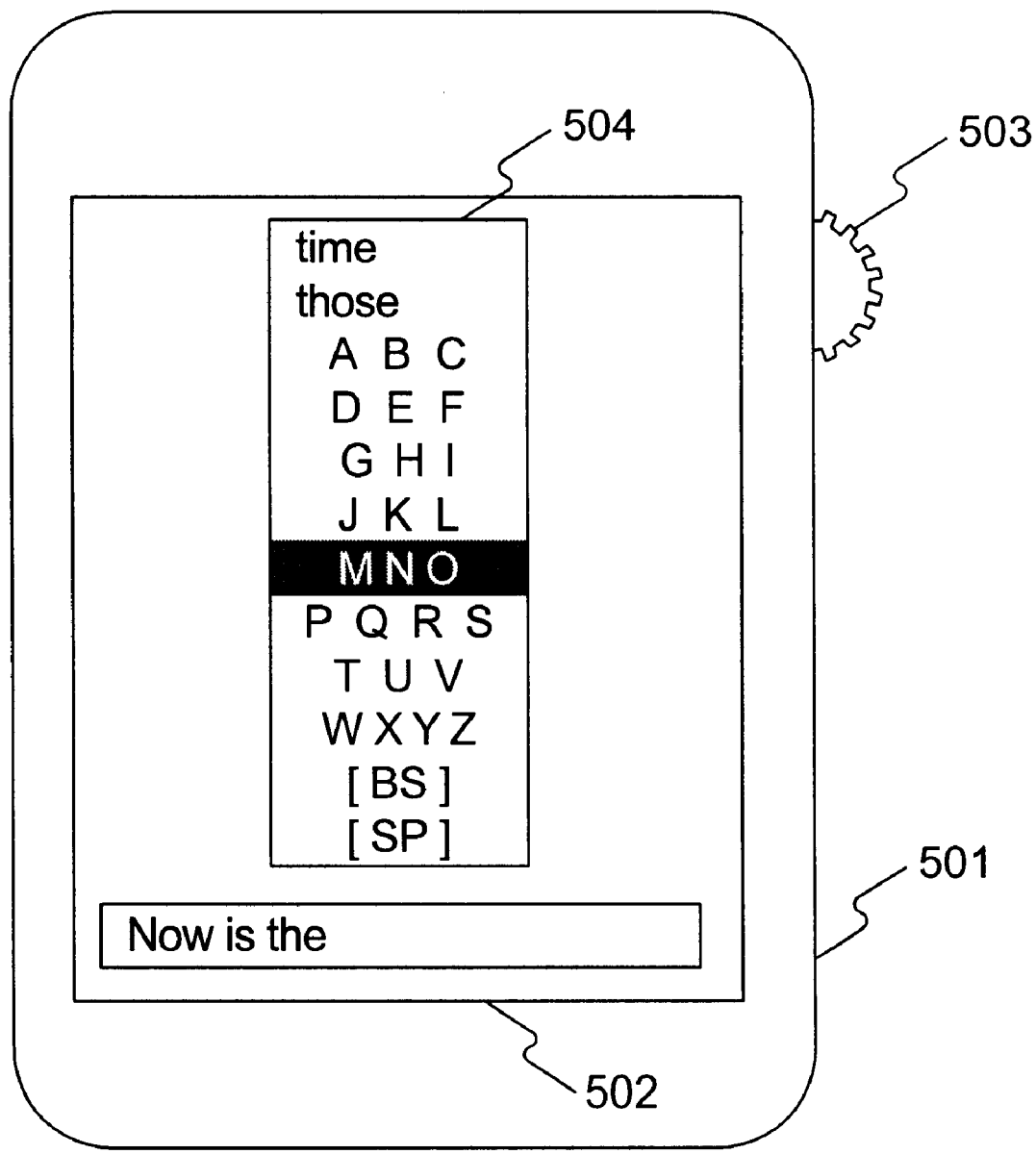
FIG. 5 shows the system for composing text as used in a miniature personal digital assistant, the display of which is in "portrait" mode.

FIG. 5 shows the system for composing text as used in a miniature personal digital assistant, the display of which is in "portrait" mode. ("Portrait" mode, as opposed to "Landscape" mode, indicates a display that is higher than it is wide.) Device 501 includes display 502 and thumbwheel 503. In this embodiment the letter items, control items, and words to choose from are contained in a single scrollable menu 504. In this example the highest-frequency word is displayed at the bottom of the list of words so as to be closest to the part of the menu containing the letters.

Figure 6A:
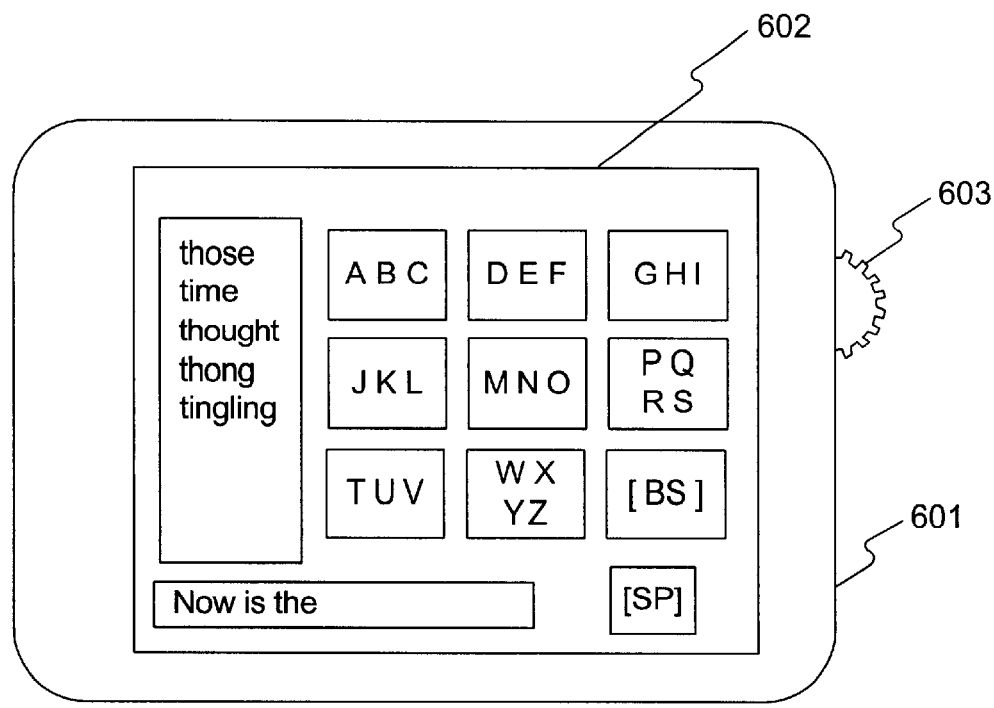
FIGS. 6A and 6B show the system for composing text as used in a miniature personal digital assistant, with a display designed to be similar to the standard telephone keypad.
Figure 6B:
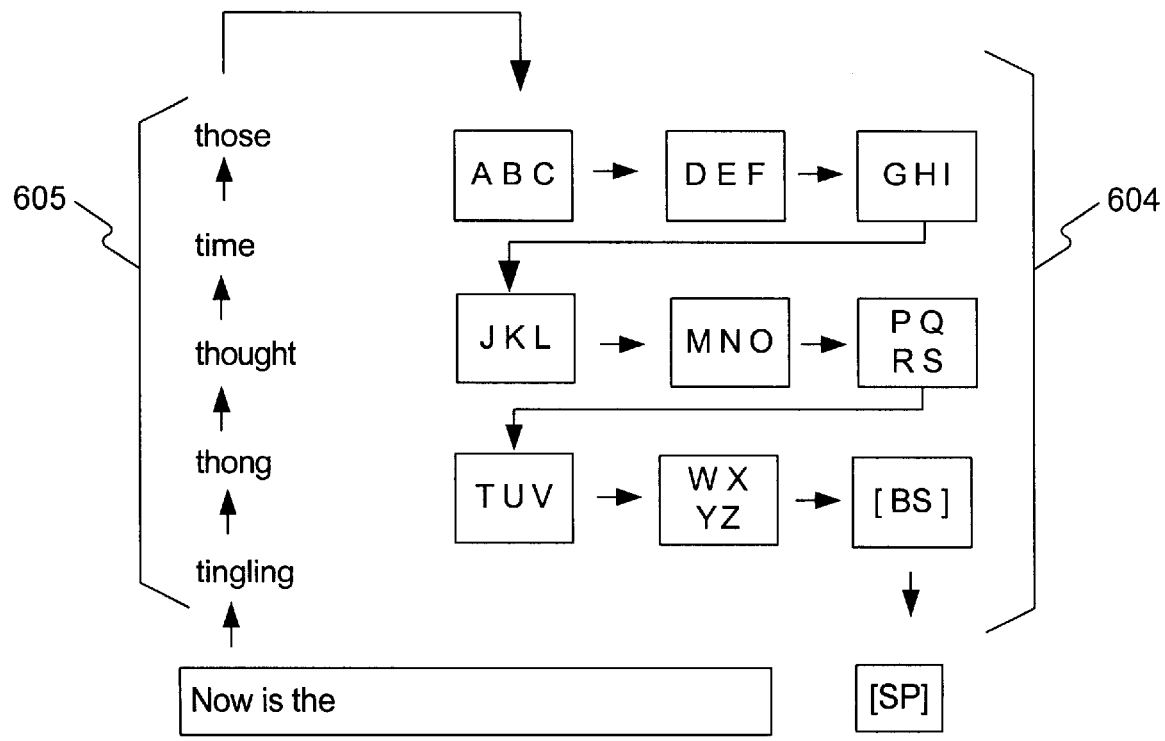

FIGS. 6A and 6B show the system for composing text as used in a miniature personal digital assistant, with a display designed to be similar to the standard telephone keypad. FIG. 6A shows the device 601, display 602, and thumbwheel 603, while FIG. 6B shows the order that items are designated as the user rotates the thumbwheel in a clockwise direction. The arrows indicate movement from one item to another as the thumbwheel is moved clockwise, including the character group inputs 604 and word inputs 605. The "clock" organization shown in FIG. 1A is generally followed, except that in the case of the keypad, a particular order within the keypad is shown. The goal of this order is to generally follow the natural order of the alphabet, and also to generally replicate the telephone keypad. An alternative would be to use the exact order used by the standard telephone keypad, in which the "ABC" menu item appears at the top of the second column from the right. However, the latter alternative is probably not very helpful for most people, since even for people who are skilled at entering text via the telephone keypad, the skill at doing so is "in the fingers", and the present perceptual-motor skill is so different from that skill that there is likely to be little transfer of training. People who enter text via the keypad by sight will likely have little trouble switching to the arrangement shown.

Figure 7A:
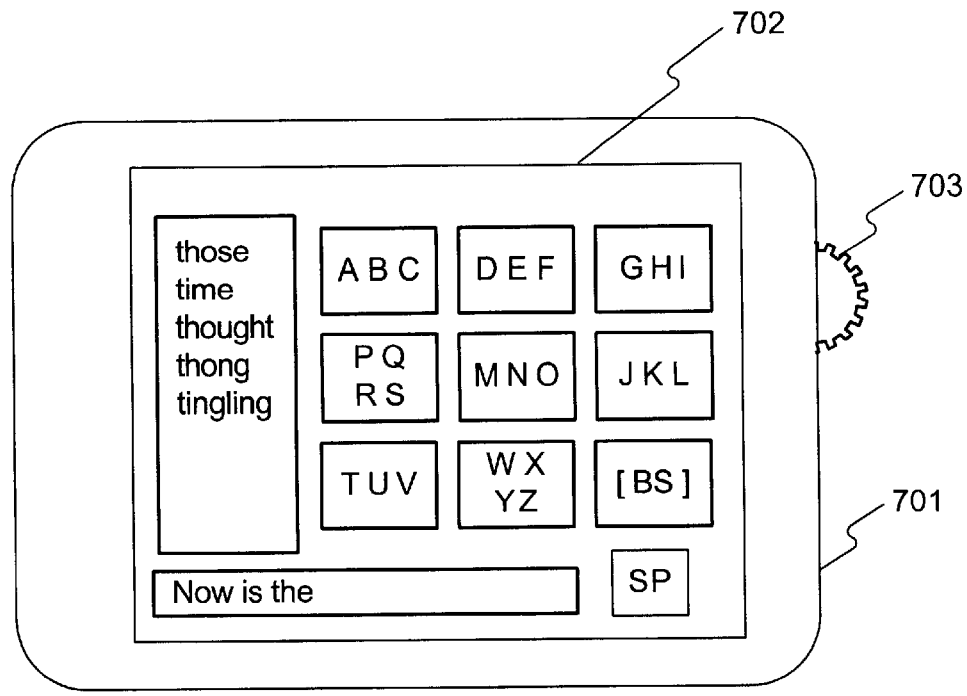
FIGS. 7A and 7B show the system for composing text as used in a miniature personal digital assistant, with a display similar to the standard telephone keypad, except that the order of movement is different from that in FIGS. 6A and 6B.
Figure 7B:
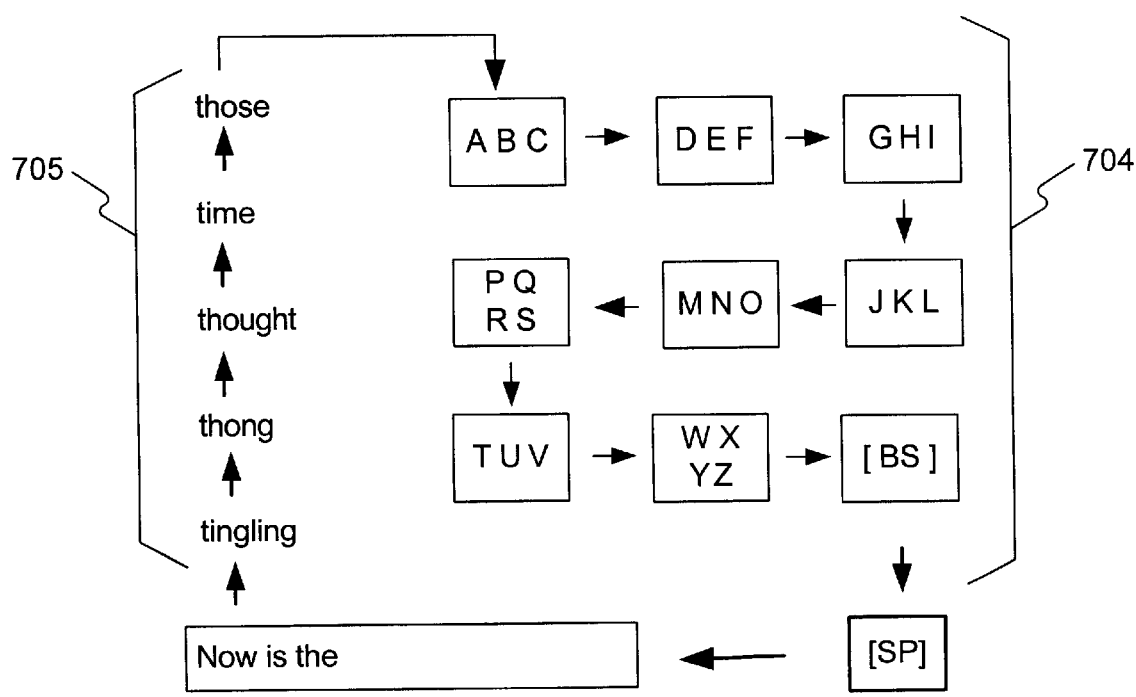

FIGS. 7A and 7B show the system for composing text as used in a miniature personal digital assistant, with a display similar to the standard telephone keypad, except that the order of movement is different from that in FIGS. 6A and 6B. Shown are device 701, display 702, and thumbwheel 703. The order of movement for the keypad is "zigzag", rather than the more conventional ordering of moving from far right to the far left key on the line just below. Shown are the character group inputs 704 and word inputs 705. The advantage of this arrangement is that the user can visually track the movement of the designation continuously, instead of having to search for the designation whenever the designation moves up or down. Because even skilled users of telephone keypad alphabetic input are likely to have little visual awareness of the location of the letters, and because the perceptual-motion skill required by the present invention is so different from conventional keypad entry, this difference is likely to be much less important than the visual tracking advantage noted above and the sequential standard alphabetic ordering as the user moves the thumbwheel.

Figure 8A:
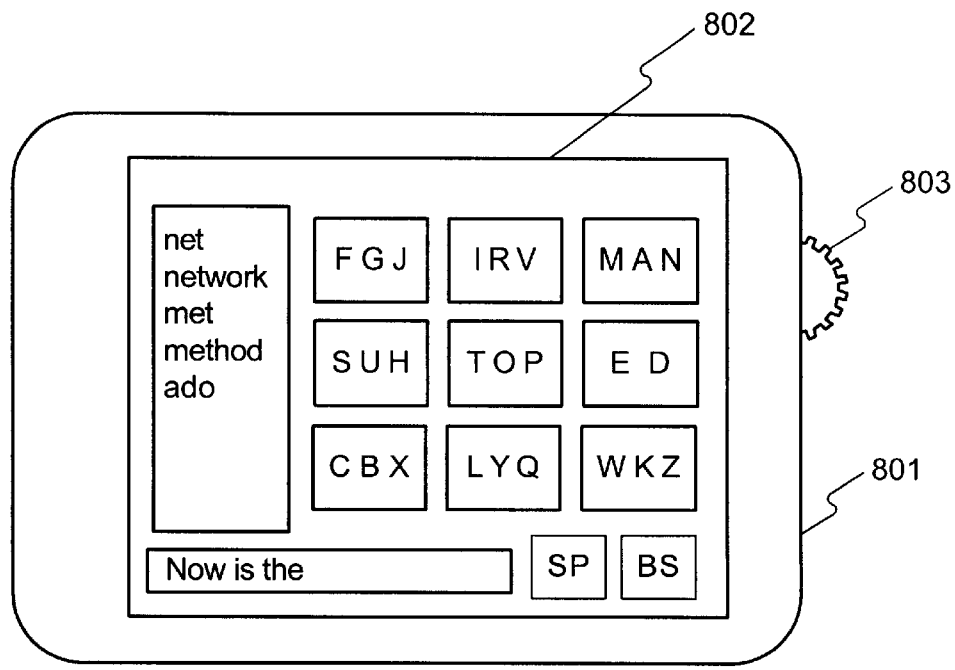
FIGS. 8A and 8B show the system for composing text as used in a miniature personal digital assistant, with a display similar to the standard telephone keypad, except that the order of movement is "zigzag", like that shown in FIGS. 7A and 7B, and the arrangement of letters assigned to each key is also different.
Figure 8B:
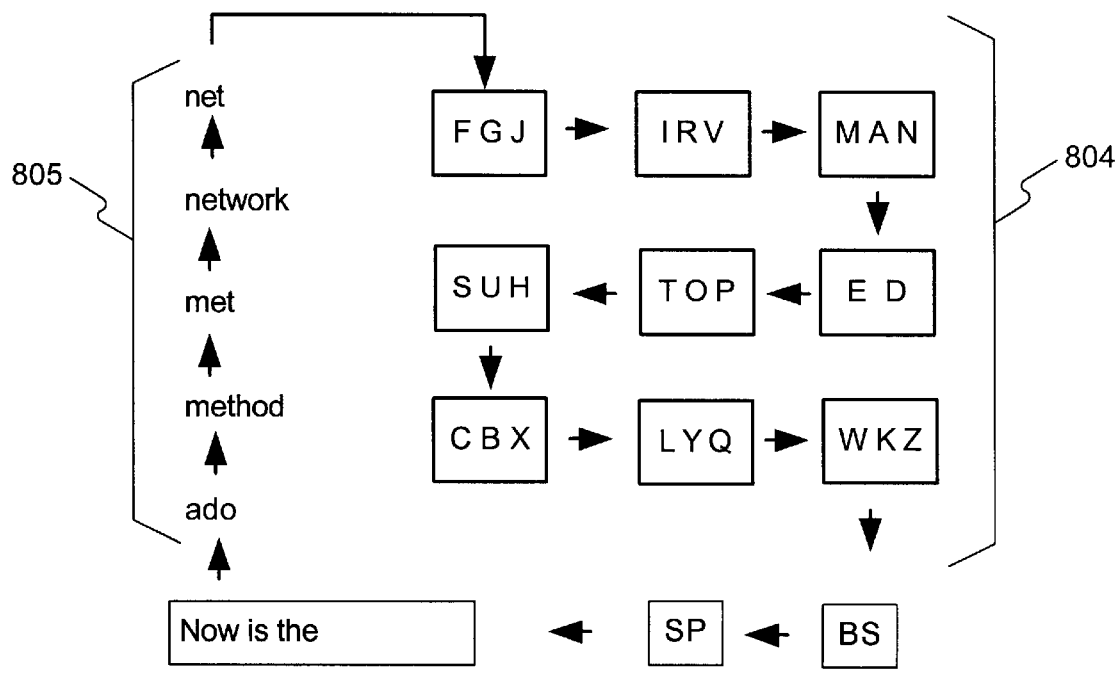

FIGS. 8A and 8B show the system for composing text as used in a miniature personal digital assistant, with a display similar to the standard telephone keypad, except that the order of movement is "zigzag", like that shown in FIGS. 7A and 7B, and the arrangement of letters assigned to each key is also different. Shown is the device 801, display 802, thumbwheel 803, character group inputs 804, and word inputs 805. The arrangement of lettering is a compromise that distributes the letters sufficiently to allow good performance for disambiguation, while insuring that the highest frequency letters are assigned to keys in such a way as to minimize total movement of the thumbwheel when entering a particular word.

Figure 9:
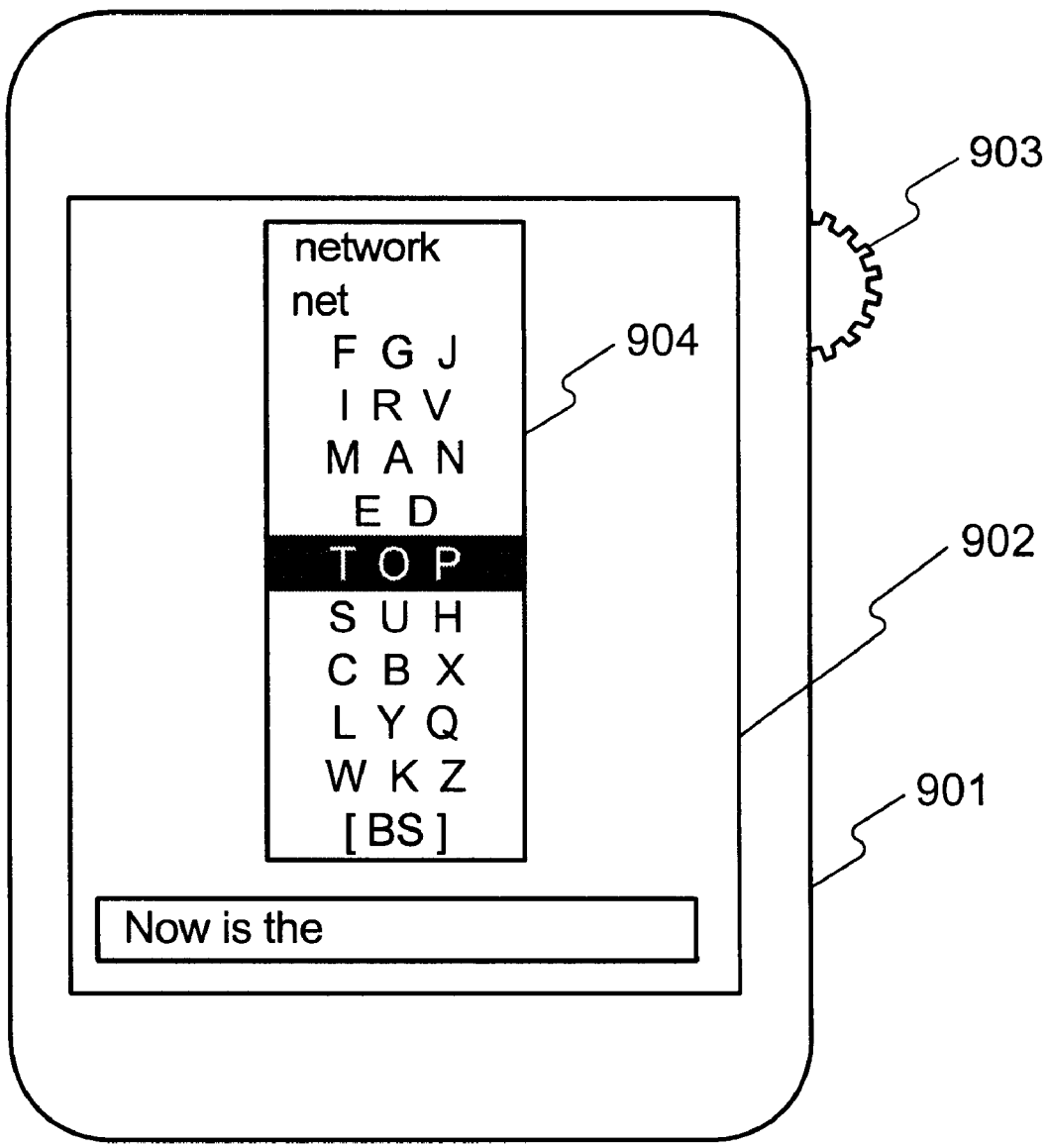
FIG. 9 shows the system for composing text as used in a miniature personal digital assistant in the same arrangement as shown in FIG. 5, except that the arrangement of letters on the menu 904 are different.

FIG. 9 shows the system for composing text as used in a miniature personal digital assistant in the same arrangement as shown in FIG. 5, except that the arrangement of letters on the menu 904 are different. Shown are the device 901, display 902, and thumbwheel 903. The arrangement of lettering is a compromise that distributes the letters sufficiently to allow good performance for disambiguation, while insuring that the highest frequency letters tend to be toward the top of the menu, thus minimizing total movement of the thumbwheel.

Alternative Platforms

Figure 10A:
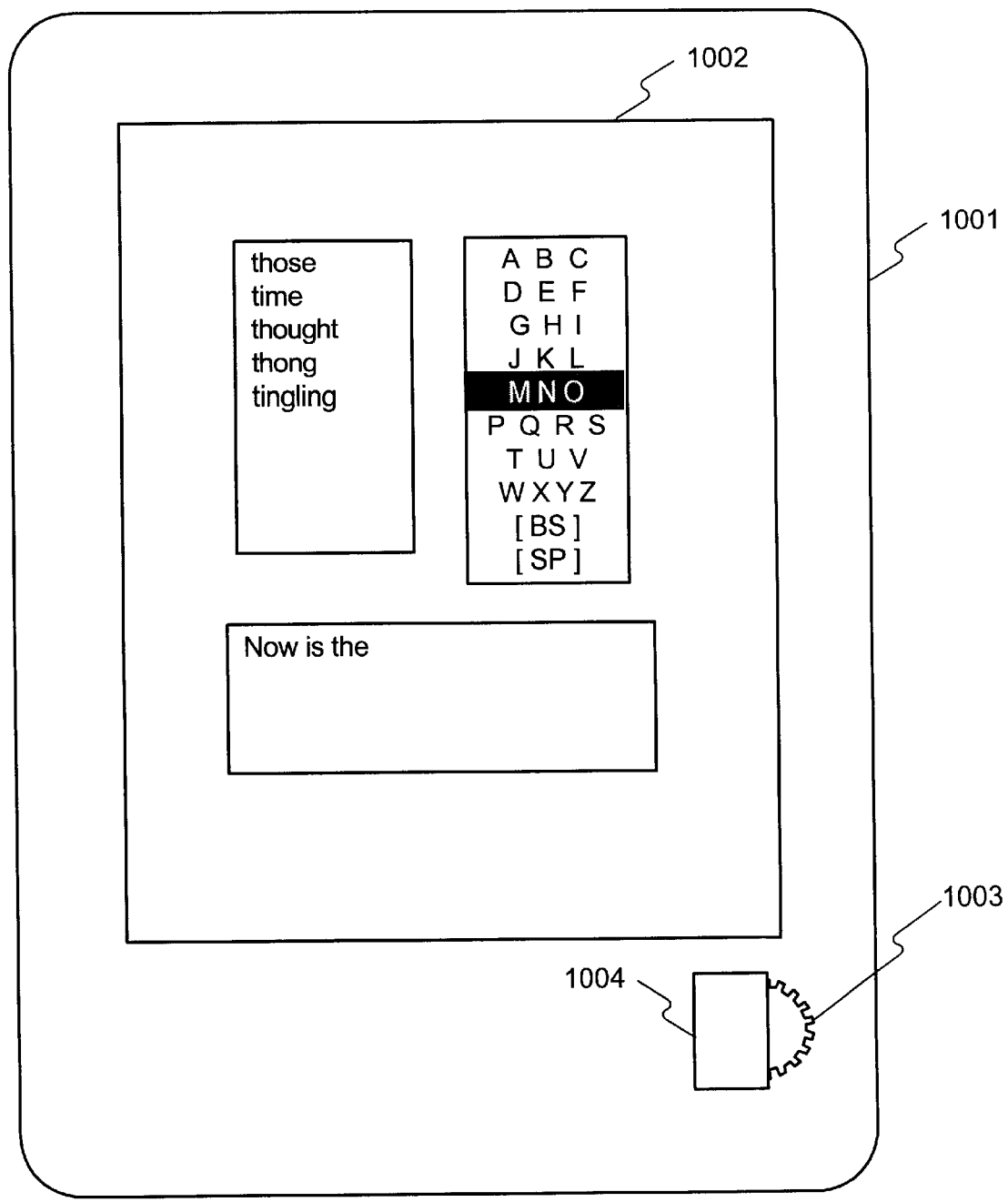
FIG. 10A shows the system for composing text as it would be embodied in an electronic book or tablet.

FIG. 10A shows the system for composing text as it would be embodied in an electronic book or tablet. Shown is the device 1001, display 1002, thumbwheel 1003, and package for thumbwheel 1004. This has a larger display 1002 than does the credit-card sized personal digital assistant shown earlier. The thumbwheel is particularly useful in an electronic book because it allows a user to scroll text up and down. Of course, the configuration shown in FIG. 5 (portrait mode with a single menu) could also be used. The approach might be particularly useful for Web browsing, with the words representing Web addresses.

Figure 10B:
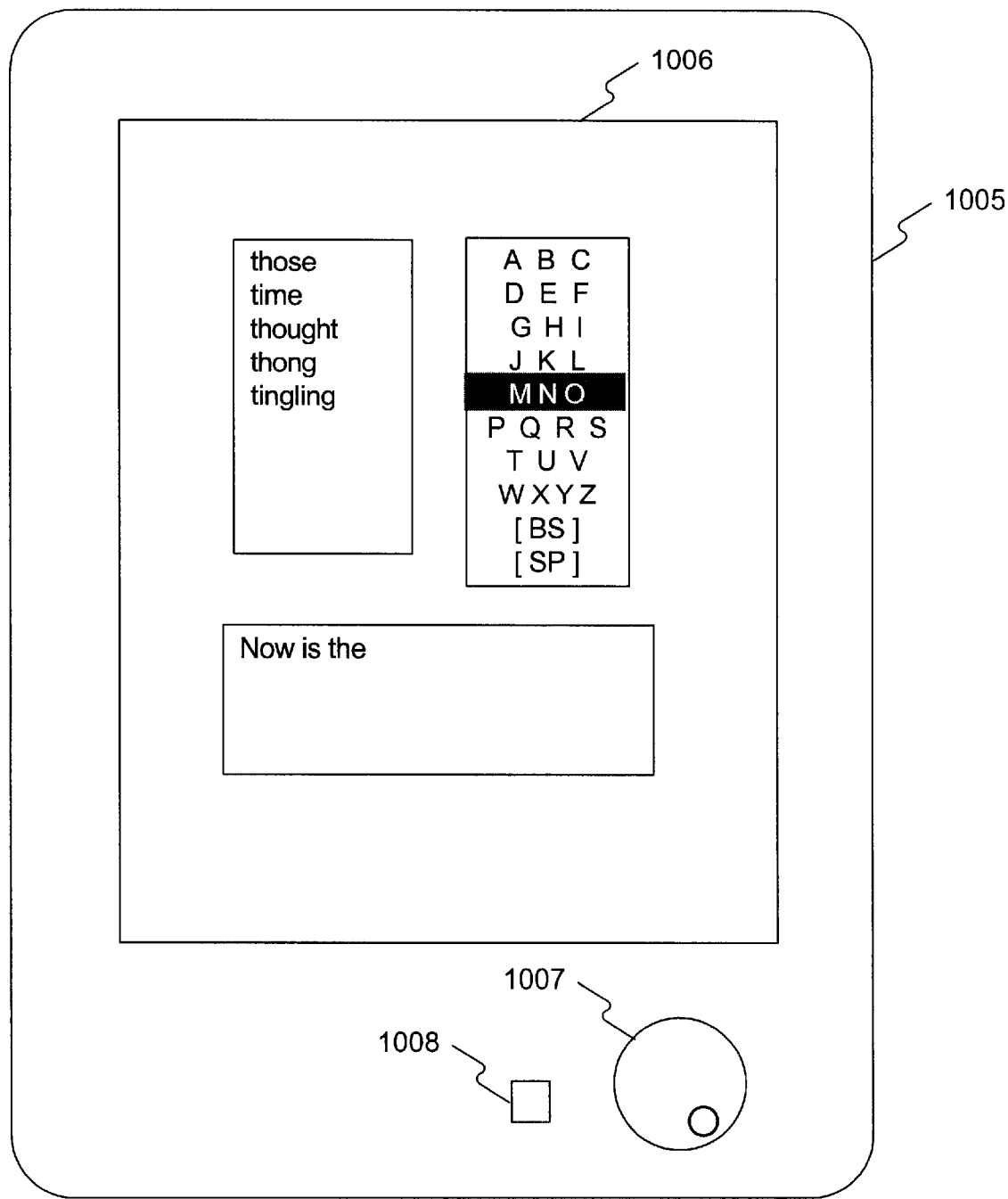
FIG. 10B shows the system for composing text as it would be embodied in an electronic book or tablet, but with a job-shuttle wheel instead of a thumbwheel. Shown is the device 1005, display 1006, jog-shuttle wheel 1007, and button or key for making the selection 1008.

FIG. 10B shows the system for composing text as it would be embodied in an electronic book or tablet, but with a jog-shuttle wheel instead of a thumbwheel. Shown is the device 1005, display 1006, jog-shuttle wheel 1007, and button or key for making the selection 1008.

Figure 11:
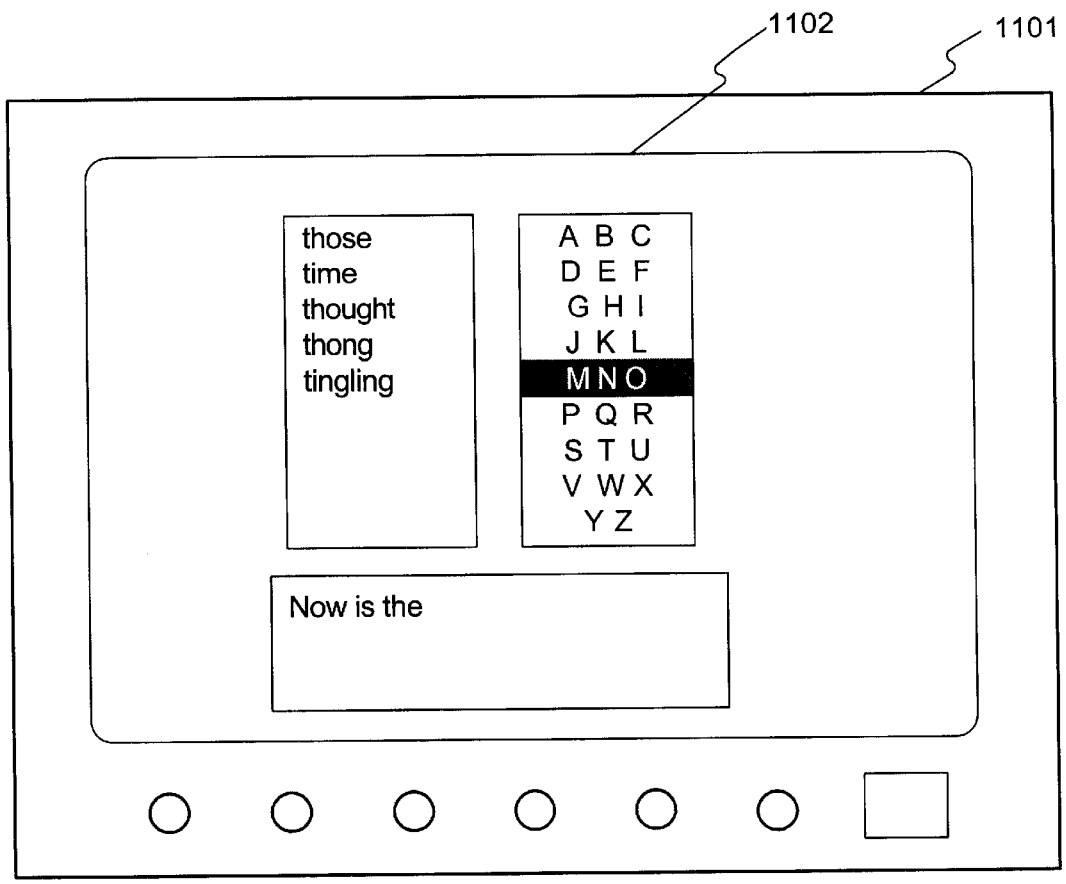
FIG. 11 shows the system for composing text as it would be embodied in a television display operated by a remote control containing a thumbwheel.
Figure 11:
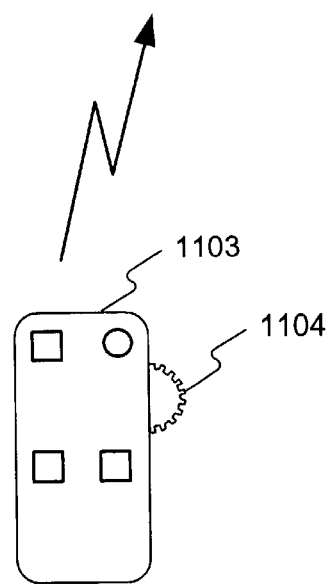

FIG. 11 shows the system for composing text as it would be embodied in a television display operated by a remote control containing a thumbwheel. Shown is a television 1101 with display 1102 and a handheld device 1103 with thumbwhel 1104. Movement of the thumbwheel a certain distance results in an infrared code being transmitted to the television set, which contains the microprocessor and memory with the dictionary. The approach is particularly useful for Web browsing. Again, the configuration shown in FIG. 5 (portrait mode with a single menu) could also be used.

Method for Editing Accumulated Text

Figure 12A:
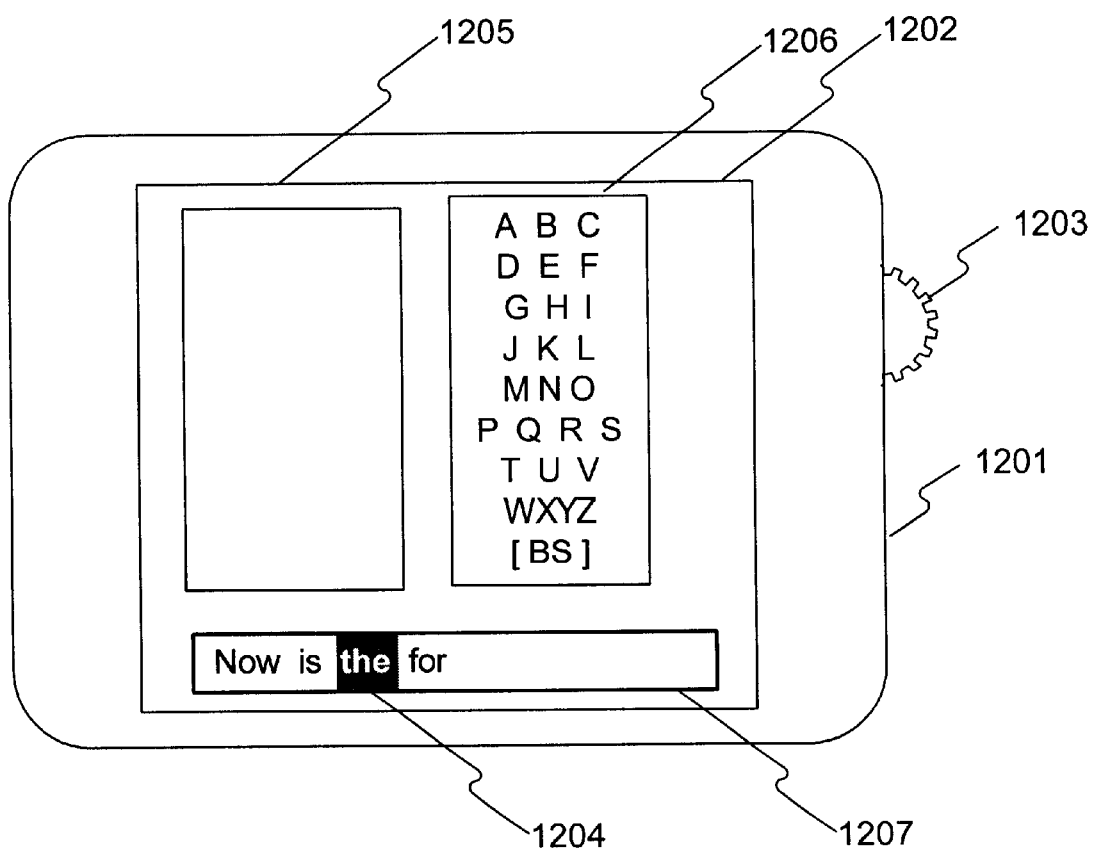
FIGS. 12A, 12B, and 12C show screens for a method of editing accumulated text.
Figure 12B:
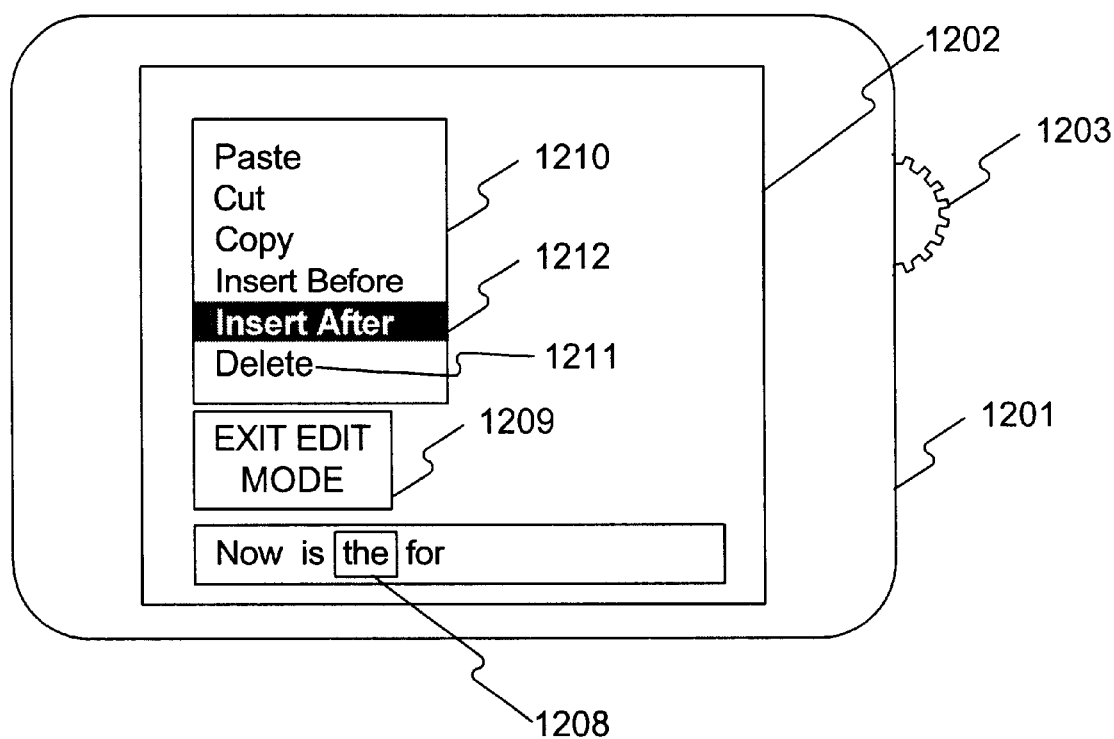
Figure 12C:
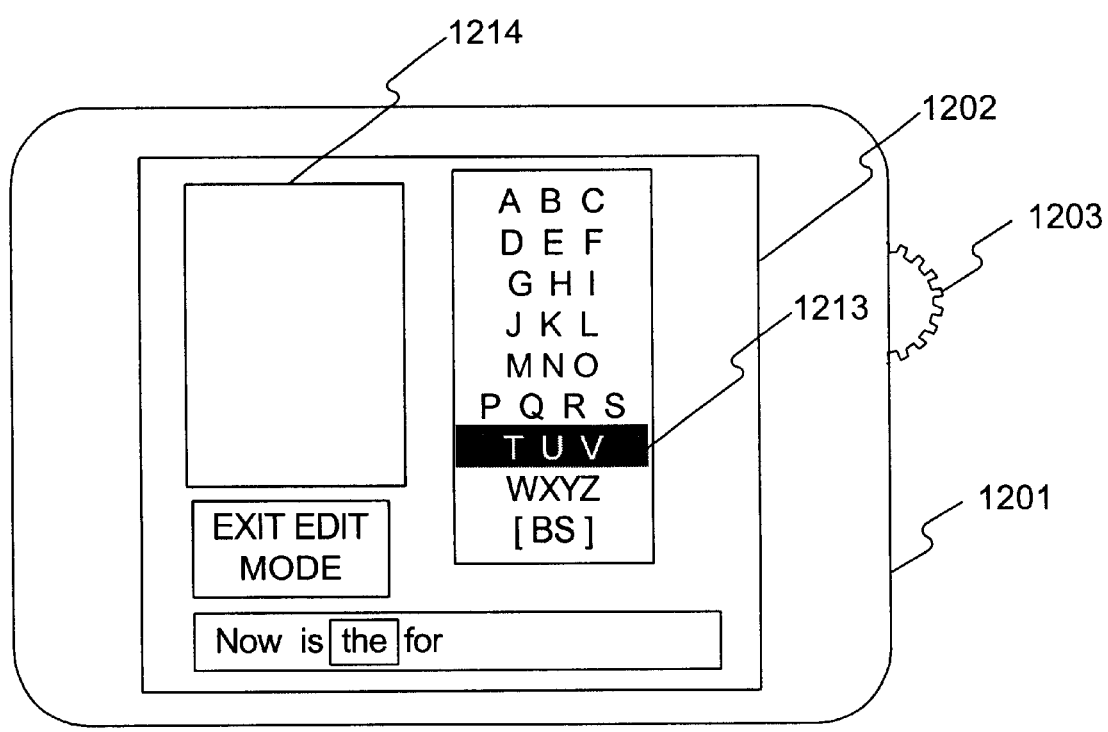

FIGS. 12A, 12B, and 12C show screens for a method of editing accumulated text.

FIG. 12A shows the initial display screen for a method for editing accumulated text in the system for composing text. The platform 1201 is a miniature personal digital assistant with display 1202 and thumbwheel 1203. The example shows the case where a user wishes to insert the word "time" after the word "the" (whereas in the examples shown earlier the user simply selected the word and it was appended to the last word in the field). The user moves the thumbwheel 1203 to designate the word "the", which is highlighted 1204. Note that the arrangement of the "windows" 1205, 1206, and 1207 in the display is such that they are clockwise-oriented, and so rotation in a clockwise fashion will move the designation in the text field to the left 1205, and, eventually, to the bottom of the window with retrieved words (which at the moment has no words displayed). Rotation in a counter-clockwise fashion will move the designation in the text field to the right 1207, and, eventually, to the bottom of the window 1206 with character groups and control items. (Note that the "windows" are one-dimensional, that is selection proceeds in a definite order.) When the user decides to edit with respect to the word "the", he or she selects the word by pressing the thumbwheel 1203 to the side. The result of this is the display shown in FIG. 12B.

FIG. 12B shows the next display screen in the sequence for the method for editing accumulated text in the system for composing text. (Alternatively, the screen in FIG. 12C can be presented first, then this screen.) This screen is shown when the user selects a word that editing is to be performed with respect to. As the user moves the thumbwheel clockwise, the designation moves to the left until the word "Now" is designated, followed by designation of "Exit Edit Mode" 1209, and then "Delete" 1211 in the window 1210 containing editing commands. In the present case, the user will designate the command "Insert After" 1212. This will bring up the screen shown in FIG. 12C to allow entry. It is also possible to "Delete" text, to "Insert Before" a particular word, to "Copy" text to a clipboard, to "Cut" (copy to clipboard and delete), and to "Paste" text from the clipboard to a location after the designated word. The "Delete", "Copy", "Cut", and "Paste" can be done for individual words or for sequences of text. To designate an individual word, the user simply designates it and selects it by pressing the button once. To designate a sequence of words, the user first designates the first word in the sequence and presses the button twice within the space of 750 mS. The user then moves the designation to the last word in the sequence and presses the button once, which will display the screen with the editing commands.

FIG. 12C shows another display screen for editing text. Here one of the character groups 1213 is displayed and designated. The user moves the thumbwheel to designate the desired input letter (ambiguously) and then selects it by pressing a button. The resulting words consistent with the sequence thus entered appear in the menu at the left 1214. The user can move the designation to one of these words, select it. Although not shown in the menu, the context ("Insert after") is generally displayed on the screen in a manner so as to suggest that it can be selected. When the word is entered control passes to the screen in FIG. 12B, so that the user can select another action. Alternatively, the screen can allow insertion of multiple sequences of words, with an additional item provided in the menu to allow the user to indicate that the entire sequence has been entered.

Mechanism for Retrieval of Words

The words are retrieved from a memory containing a list of words together with an associated word frequency, that initially is obtained from analysis of large amounts of text. This is available from standard sources, including the corpus developed at Brown University by Kucera and Francis. (See *Computational Analysis of Present Day American English*, by Henry Kucera.) It is also available in print form, such as in *The American Heritage Word Frequency Book*.

The specific mechanism for real-time retrieval requires a design optimized for such searching. This is typically done as a decision tree, in which a predetermined sequence of tests are made on a newly entered character group when that character group is entered. Thus, when the first character group is entered, a decision tree looks at the character group and, on the basic of which character group it is of the possible character groups, is directly referred by a software "pointer" to those words consistent with the entry of the item that has been entered, which can then be retrieved and displayed. When the second character group is entered, the system goes another level down the decision tree.

Data Structure for Input of Words

Figure 13A:
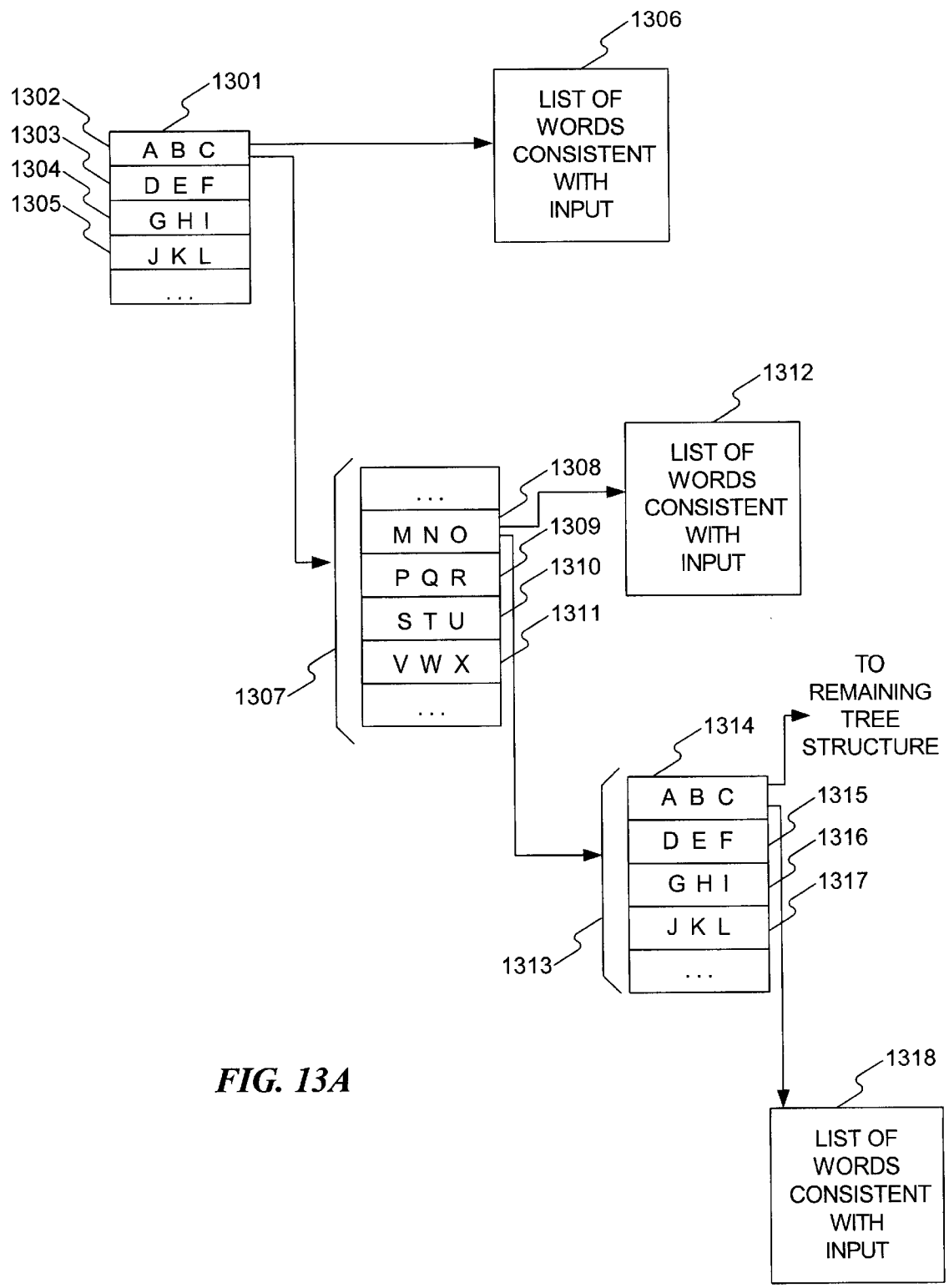
FIGS. 13A and 13B show the data structures involved in the input of words using the rotating cylinder.
Figure 13B:
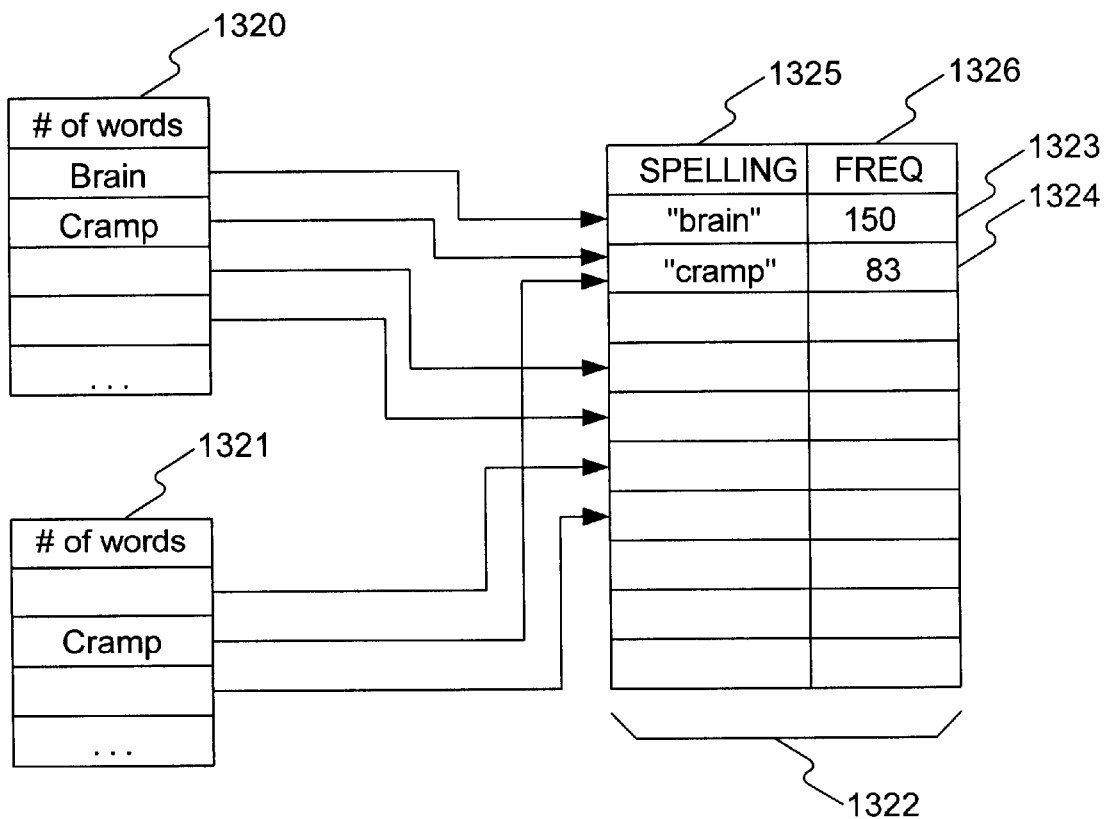

FIGS. 13A and 13B show the data structures involved in the input of words using the rotating cylinder.

FIG. 13A shows the overall organization of the data structure for one example word input case. This is in effect a list, or database, of words, that has indexes that have been precompiled to allow very rapid access of words consistent with a particular sequence of character group inputs that have been entered. The structure has a tree structure, with a particular path through the tree corresponding with a particular sequence of character group inputs. For clarity, only those parts of the tree structure necessary to input the example word "brain" are shown. Note, however, that, for example, each field in each data structure that represents a particular context and associated character group will have (with only a very few exceptions) pointers to a list of words and to a further part of the structure.

This structure also assumes a set of character groups defined as "ABC", "DEF", "GHI", "JKL", and (not shown) "MNO", "PQR", "STU", "VWX", and "YZ". Data structure 1301 contains a field 1302 through 1305 for each character group, including 1302 for "ABC", 1303 for "DEF", 1304 for "GHI", and 1305 for "JKL". This structure 1301 is associated with the context in which only one character group has been entered, with each field corresponding to a particular potential character group. Each field contains two pointers. One pointer points to a list of words 1306 consistent with the character groups input so far. A second pointer points to a data structure 1307.

This data structure 1307 is associated with the context in which a second character group has been input, which contains a field 1308 through 1311 for each input character group, where the character groups shown are "MNO", "PQR", "STU", and "VWX". Note that for the input word "brain" the first character group entered was "ABC" and thus the second character group will be "PQR" from structure 1307. Note that each of the character groups in structure 1307 also has pointers to corresponding lists of words analogous to 1306 and to corresponding further data structures in the tree, although for clarity they are not shown in the present figure. For the field 1308 in data structure 1307 there are two pointers, one to a list of words 1312 consistent with the two character groups entered so far—"ABC" and "PQR", and the other to a further part of the tree structure, data structure 1313.

Data structure 1313 is associated with the context in which a third character group has been input, which contains a field 1314 through 1317 for each character group, where the character groups shown are "ABC", "DEF", "GHIE", and "JKL". Again, for the input word "brain", the character input groups will have been "ABC", "PQR", and, again, "ABC". The field 1314 for "ABC" contains a pointer to a list of words 1318 consistent with the three character groups that have been entered so far, and also contains a second pointer to a further structure in the tree that is not shown.

The mechanisms described for retrieval of words are similar to those used in the invention described in the published PCT application WO 98/33111 by King, et al, and assigned to Tegic Communications. It is also described in U.S. Pat. No. 5,818,437 to Grover, et al., also assigned to Tegic Communications. These applications assigned to Tegic are incorporated by reference into the present application.

FIG. 13B shows the data structures for the list of words for a particular context and for the dictionary of words. Lists of words for two contexts 1320 and 1321 are shown, with each including a count of the number of words and, for each word, a pointer to the corresponding word in a common dictionary representation 1322. The point is kept rather than the spelling of the word itself to conserve memory. For example, the word "brain" is represented 1323 in the dictionary, as well as the word "cramp" 1324. Each dictionary item contains two fields, one indicating the spelling 1325 of the item and the other indicating the relative frequency 1326 of the word's use in the context that it is used in (e.g., natural language text, or frequency of use of an electronic mail address as calculated by a program that monitors the number of mail messages sent to a particular person. In use, when a user enters a character group, a list of words is retrieved and then, for each word in the list, the frequency is retrieved and used to order the list, along with other criteria such as more recent use that may be stored in the particular system. The list of words when precompiled can also be in order of frequency of use. The spelling of each word is also retrieved and used to display the word.

Presentation of Display to Disambiguation by Letter

Figure 14A:
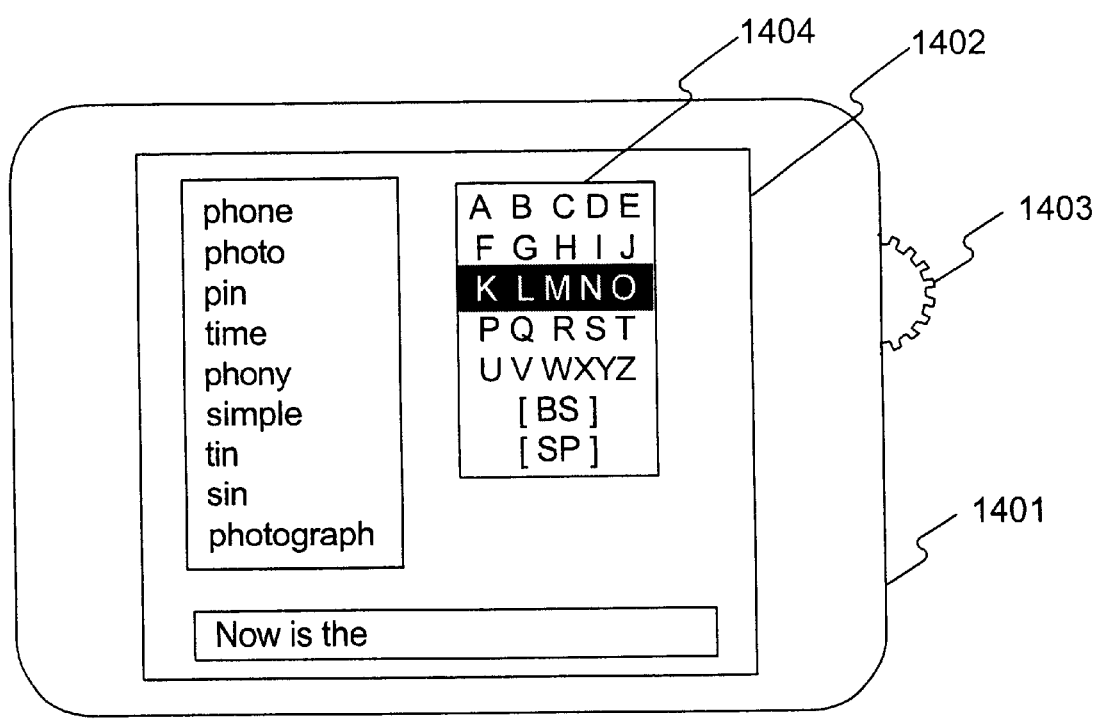
FIG. 14A shows a screen of the personal digital assistant just before calculations are made to determine whether the user should be presented with the opportunity to disambiguate a particular previously entered character group.

FIG. 14A shows a screen of the personal digital assistant just before calculations are made to determine whether the user should be presented with the opportunity to disambiguate a particular previously entered character group. The figure shows device 1401, display 1402, and thumbwheel 1403. This is the same as that shown in FIG. 1A. Note that there is a window 1404 showing five character groups, each with five letters (except for one that has six). In this case, it is better to disambiguate an existing letter rather than enter a new letter more than half the time—particularly given that the system requests a disambiguation of only that character group that has the greatest effect. This of course ignores the extra overhead of moving the designation away from the character groups to the specific letters, and the mental effort required to monitor whether such a disambiguation request is being made and determining which letter in the sequence is being requested.

Figure 14B:
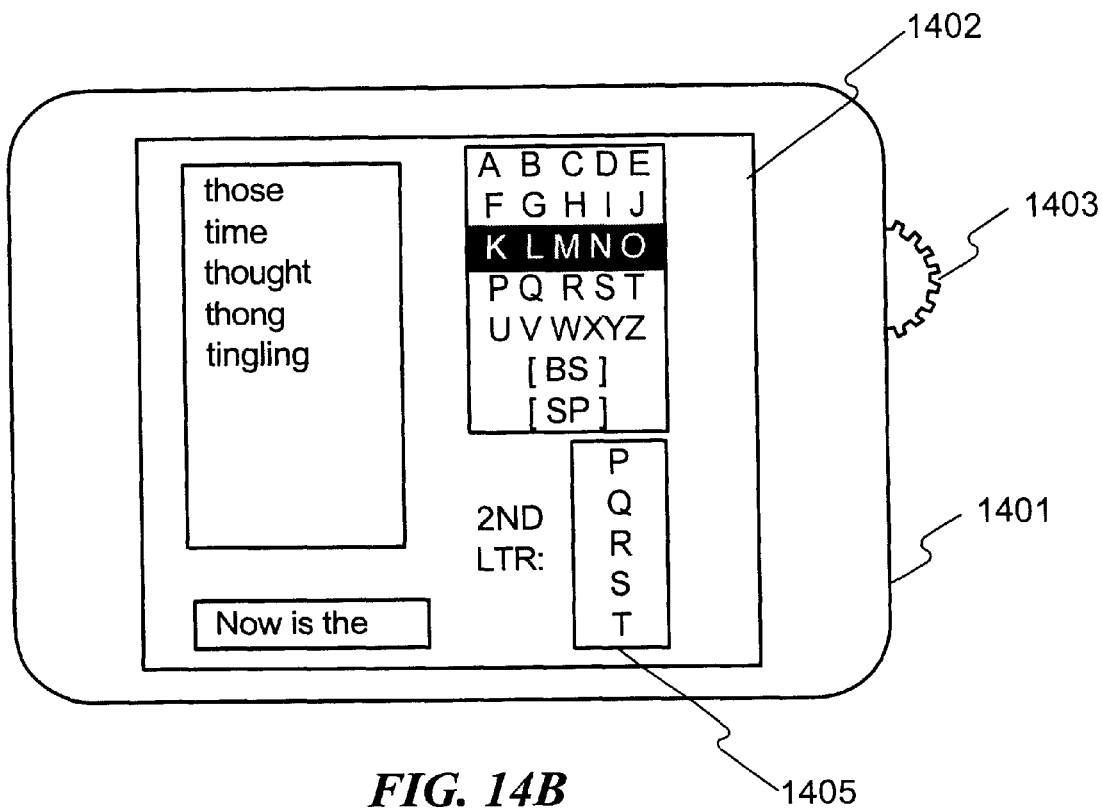
FIG. 14B shows a screen of the personal digital assistant containing a menu allowing the user to disambiguate a particular character group already entered.

FIG. 14B shows a screen of the personal digital assistant containing a menu allowing the user to disambiguate a particular character group already entered. This menu 1405 is only displayed in circumstances where it is advantageous for the user to perform this disambiguation. This version is arranged such that moving the thumbwheel in a counter-clockwise manner will cause the designation to move from the top end of the menu containing character groups and control selections to the first, then second, and then third item indicating an individual letter that can be chosen.

After each character group has been entered, those words consistent with the sequence of character groups are retrieved from the memory. (Part or all of these words are eventually displayed on the screen). In general, for systems with reasonably large numbers of keys such as a telephone keypad, the easiest way for the user to further disambiguate the sequence that has been entered—should the list of words displayed be too long to scroll through effectively) is to enter an additional character group, that is, ambiguous group of letters. This of course depends in part upon the configuration of menu items—the number of items and the number of letters contained in each item. If there are, for example, nine character groups, with each character group containing three letters (except for a single character group that contains two letters, to get a total of 26), then an additional entry of a character group has relatively high information value, considerably more on the average that of that of disambiguating an already-entered group of 3 letters to a particular letter. (An easy way to think of this is that any choice-e.g., a key being pressed-reduces the space of words being searched. If there are three possible choices, choosing one reduces the space by, on average, two-thirds. If there are nine choices, the space is, on average, reduced by eight-ninths.) (This is on the average-it depends greatly on the particular sequences and words involved). However, if there are only five character groups (five letters per item, except for one that has six), disambiguating a randomly selected already-entered character group has roughly the same information content as entering a new character group. When the number of letters per character group is greater than the number of character groups, the amount of information resulting from disambiguating an already-entered character group is greater than that of entering a new character group.

If the system is designed so as to request such disambiguation dynamically, the disambiguation becomes much more favorable, even in cases where relatively few letters are contained in an character group. This is for two reasons.

First, the system can request that the user disambiguate that previously entered character group that would do the most to reduce the search space. Second, the system can request a disambiguation only when it is desirable—when, given the particular sequence entered and the words being retrieved result in it being a more efficient thing to do compared with entering an additional character group. The flowchart in FIG. 14 shows the procedure for determining when disambiguation is desirable and which item is the best to be disambiguated.

Figure 14C:
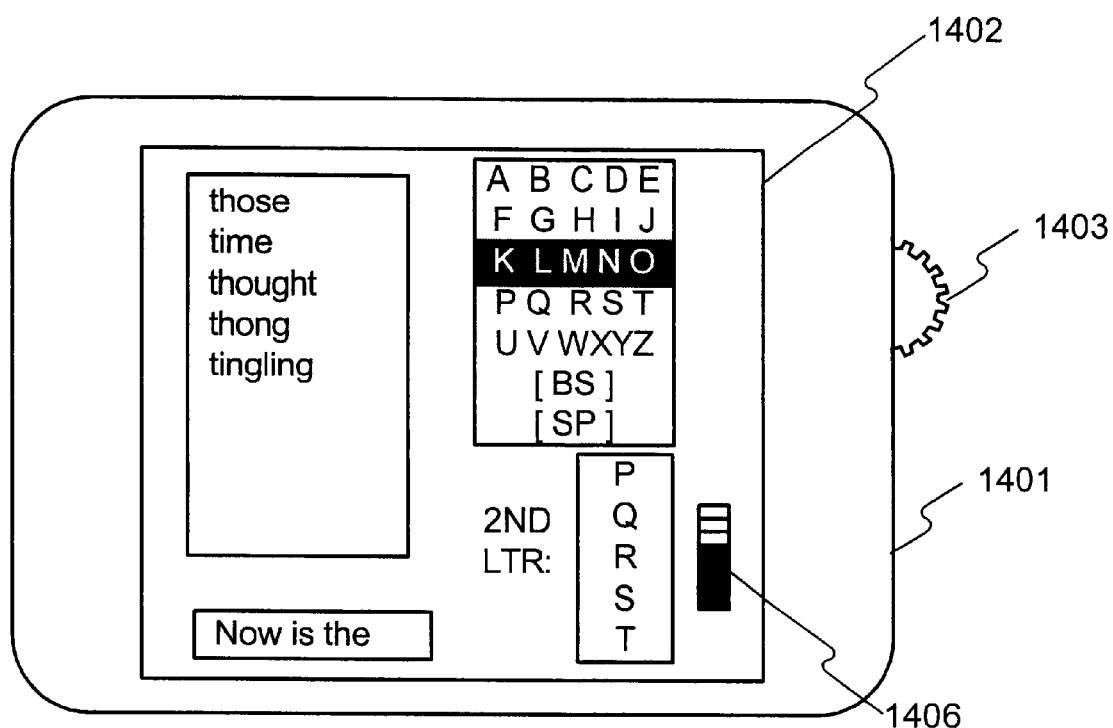
FIG. 14C shows the same screen shown in FIG. 14B, but with the addition of a display indicating the value, in a bar graph form, of entering the letter rather than a new ambiguous item.

FIG. 14C shows the same screen shown in FIG. 14B, but with the addition of a display indicating the value, in a bar graph form, of entering the letter rather than a new ambiguous item. This is particularly useful in an adaptive system. In such a system, when the user begins using the device, the bar graph is always displayed, and responses from the user are recorded along with the value of the bar graph. After sufficient data has been collected, and it is clear for what threshold the user prefers to choose entering a new character group to disambiguating an old one, the presentation of the option to disambiguation can be suppressed in situations below this threshold.

It is also possible for a screen to be arranged such that the individual letters are contained as part of a larger, scrollable menu. An unusual aspect of the scrollable menu is that the 3 items included have, to the left, ("$2_{nd}$ letter") a label indicating information necessary to determine what response is desired if these items are chosen. The label also scrolls with the menu but is not actually part of it (does not get designated).

The method for disambiguation by letter described here is also applicable to devices that use input mechanisms other than the thumbwheel. It is applicable to devices that use keys, touchscreen displays, joystick-operated displays, and "soft" keys. In some cases, such as miniature personal digital assistants that have a limited number of soft keys, the labels for the keys are only displayed in response to the user deciding, typically in response to a display indicating that letter disambiguation is desirable, to enter a letter unambiguously, which will typically replace the ambiguous keyboard with the (narrower options) unambiguous keyboard for the single selection required.

Procedure for Disambiguation by Letter

Figure 15:
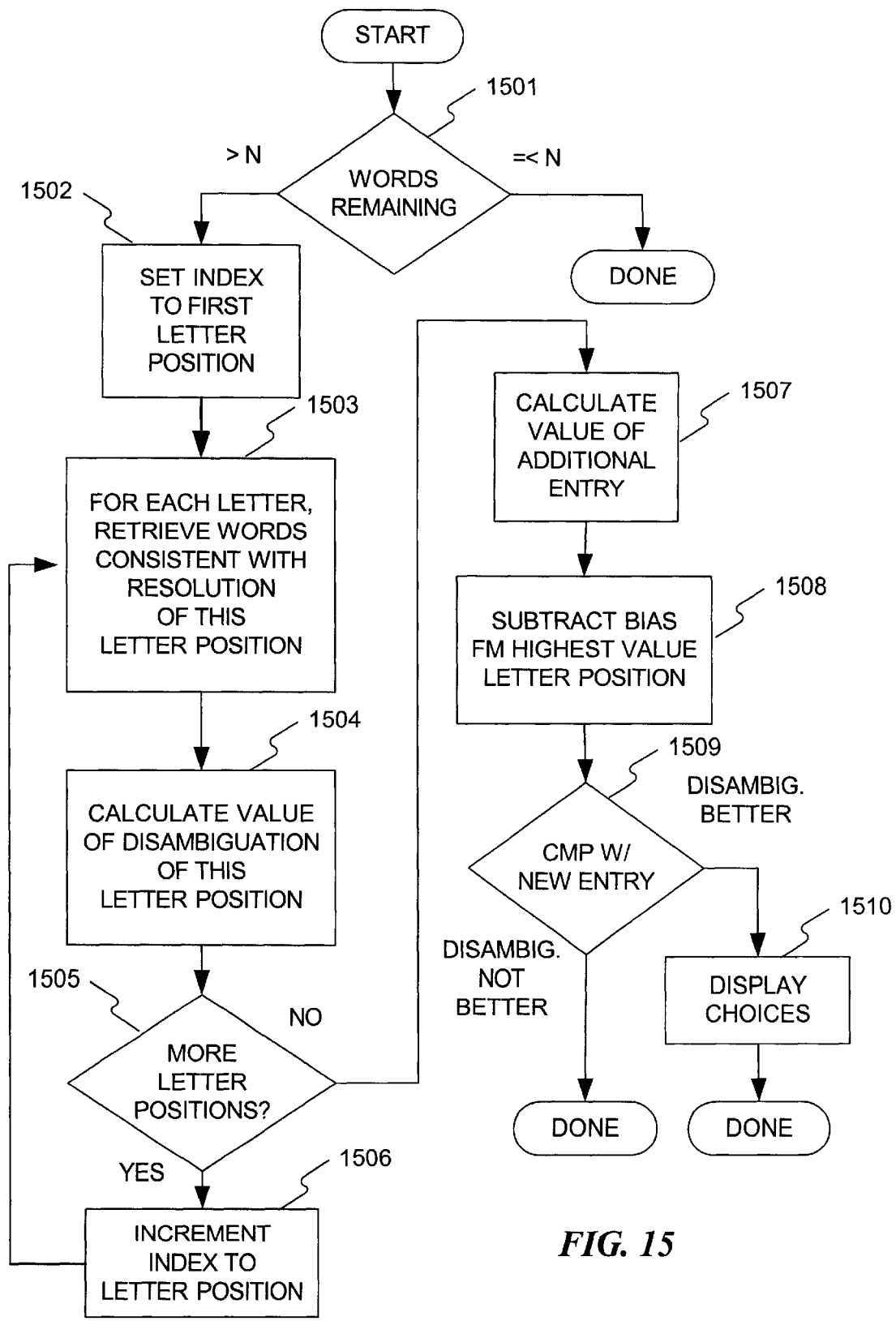
FIG. 15 shows a flowchart of the procedure for handling dynamic requests to the user for disambiguation of a particular character group.

FIG. 15 shows a flowchart of the procedure for handling dynamic requests to the user for disambiguation of a particular character group. The system first compares 1501 the number of words remaining (that is, either displayed or available for display), given the sequence of character groups entered so far, with a constant N. This constant is set such that if there are so few words that it is easier to scroll through and select one than to disambiguate an item, there is no attempt made at disambiguation by the user. N is generally about ten to twenty, depending upon the size of the display. If the number of words remaining is less than or equal to N, then no disambiguation by the user is requested and the procedure is done. If the number of words remaining is greater than N, a calculation is first made, for each letter position, of the value of disambiguating the character group entered for that letter position. This is carried out by first setting an index 1502 to the first character group in the sequence that has been entered. Then, for each letter contained in the character group in the particular letter position, those words containing that letter in the particular letter position are retrieved 1503. A calculation is made 1504 of the amount that the number of remaining words is reduced if that letter is selected, according to the formula: amount of reduction =(number of words before selection−number of words after selection)/number of words before selection. In addition, a running sum of the number of words retrieved after each letter selection is kept. The value of disambiguation of this letter position is then calculated. This is done as follows: For each letter that could be selected in the letter position, the words consistent with that letter are retrieved. For each word, the amount of reduction of words for the particular letter (calculated above) is multiplied by the frequency of occurrence for that word. The result is summed across all words for the letter, and eventually all words for all letters in the character group. This gets a measure of value of selecting that letter, normalized by the likelihood that the user would actually choose the words remaining after disambiguation of the letter (and thus the letter itself, in this context).

In algorithmic language, the calculation for each letter position is as follows:

```
BEGIN
NwordsTotal = 0;
For i = 1 to Nletters
    BEGIN
        Reduction[i] = (NremainingBefore − NremainingAfter[i])/NremainingBefore[i];
        NwordsLetter[i]= NremainingAfter;
        NwordsTotal = NwordsTotal + NwordsLetter[i];
    END
Sum Value = 0;
For i = 1 to Nletters;
    BEGIN
        For j = 1 to NwordsLetter[i]
            BEGIN
                SumValue = SumValue + (Reduction[i] * Frequency_word;)
            END
    END
Value= SumValue/NwordsTotal;
END
```

Where
  NwordsLetter[i] are the number of words remaining after a letter i has been selected.
  NwordsTotal is the sum of NwordsLetter[i] for each letter.
  Nletters is the number of letters in the character group.
  NremainingBefore is the number of words remaining after the existing sequence of character groups has been entered, but before any disambiguation to a particular letter within a character group.

NremainingAfter[i] is the number of words remaining after the existing sequence of character groups has been entered and after the entry of a particular letter i within a character group.

NwordsLetter[i] is the number of words remaining after entry of a particular letter i.

NwordsTotal is the sum total of the number of different words remaining after each letter has been selected, one at a time, to disambiguate the letter position in question.

$Frequency_{word}$ is the frequency of occurrence for the word retrieved from memory.

SumValue is a running summation of the normalized value contribution contributed by each possible target word.

Value is the calculation of the value of selecting a particular letter of a character group.

The theory of the calculation is based on simulation. For each letter selection, we identify a target word that we assume the user intends to enter. We determine the amount of reduction of words attributed to the letter selection that produced the target word, and multiply it by the word frequency because this tells us how likely (compared to other letters, other letter positions, and the entry of a new character group) that aspect of the simulation is, and therefore how much it should have an impact on the value.

(Note in the above that it is possible to implement the above procedures in a somewhat more computationally efficient manner, for example by first summing the word frequencies for all words consistent with a particular letter (in the case of the first algorithm), then multiplying by the amount of reduction of words resulting from selecting that letter. The procedures described here are shown for clarity of understanding the basic approach, and changes to improve the efficiency of computation can be done by programmers with ordinary skill in that art.

A test is then made 1505 of whether there are more letter positions for which calculations need to be made. If yes, the index to the letter position is incremented 1506, and control is passed to the step of retrieving words consistent with resolution of this letter position. If there are no more letter positions, control passes to the step of calculating the value of an additional entry of an character group 1507. This is done as follows: For each character group that the user might enter, a calculation is made of the number of remaining words after the entry is made, and then a calculation of the amount of reduction of words resulting from the entry. When the amount of reduction is known for each character group, a calculation is then made as follows: For each character group, the words remaining after selection of that item are identified, and the frequency of occurrence for each word retrieved from memory. The amount of reduction resulting from the selection of that character group is then multiplied by the word frequency for each word. The result of each multiplication is summed across all words for that character group. The resulting sums for each character group are then summed across all character groups. The sum of multiplications across all character groups is then divided by the sum total number of words remaining after any selection of an character group.

In algorithmic language, the calculation for the value for entering a new character group is as follows:

```
BEGIN
NwordsTotal = 0;
For i = 1 to NalphaItems
    BEGIN
        Reduction[i] = (NremainingBefore - NremainingAfter[i])/NremainingBefore[i];
        NwordsalphaItem[i]= NremainingAfter;
        NwordsTotal = NwordsTotal + NwordsalphaItem[i];
    END
SumValue = 0;
For i = 1 to NalphaItems;
    BEGIN
        For j = 1 to NwordsalphaItem[i]
            BEGIN
                SumValue = SumValue + (Reduction[] * Frequency_word;)
            END
    END
Value= SumValue/NwordsTotal;
END
```

Where

NwordsalphaItem[i] are the number of words remaining after a new character group has been selected.

NwordsTotal is the sum of NwordsalphaItem[i] for each letter.

NalphaItems is the number of letters in the character group in the next entry to be made.

NremainingBefore is the number of words remaining after the existing sequence of character groups has been entered, but before any additional character groups are entered.

NremainingAfter[i] is the number of words remaining after the entry of a new character group.

NwordsalphaItem[i] is the number of words remaining after entry of a particular character group i.

NwordsTotal is the sum total of the number of different words remaining after each character group has been selected, one at a time, to further disambiguate the word being entered.

$Frequency_{word}$ is the frequency of occurrence for the word retrieved from memory SumValue is a running summation of the normalized value contribution contributed by each possible target word.

Value is the calculation of the value of entering a new character group.

The letter position that has the highest value for disambiguation is then selected, and a bias subtracted 1508 from it. The bias is empirically determined and reflects the greater effort of entering a letter as opposed to a new input character group—the user must determine what corresponds to the letter position asked for, and move the thumbwheel so as to designate the letter desired. The remaining value is compared 1509 with the value for making a new character group entry. If the value for making a new entry is higher or equal, the procedure is done. If the value for disambiguating an existing entry is higher, the letter choices are displayed 1510 and the procedure is done.

I claim:

1. A method for entering words into a computer system, comprising the steps of:
    displaying an ordered sequence of items, wherein at least two of the items comprise two or more characters, and wherein one item in the ordered sequence is designated by displaying it in a manner different from the others;
    moving the designation of an item in response to the movement of a rotating cylinder until a desired character is contained in the item being designated, with the force required for the movement of the rotating cylinder varying depending upon the relationship of the cylinder position with an item;
    selecting the designated item, thus ambiguously selecting one of the two or more characters, by pressing a button;
    adding the group of characters corresponding to the selected item to a sequence of groups of characters that ambiguously describe the beginning sequence of characters of a desired word;
    retrieving at least one word from a memory consistent with the sequence of selected groups of characters;
    adding the at least one word to the ordered sequence of items;
    displaying the at least one word added;
    selecting the desired word by moving the cylinder so as to designate the desired word and pressing the button.

2. The method of claim 1, further comprising the step of:
    selecting a menu item representing a particular character from the two or more characters.

3. The method of claim 2, further comprising the step of:
    removing those words from the ordered sequence of items that do not contain the particular character selected in the corresponding position.

4. The method of claim 3, further comprising the step of:
    determining the comparative effectiveness in reducing the number of words consistent with the current input resulting from selecting an additional ambiguous two or more characters as opposed to selecting a particular character.

5. The method of claim 4, further comprising the step of:
    indicating to the user the comparative effectiveness in reducing the number of words consistent with the current input resulting from selecting an additional ambiguous two or more characters as opposed to selecting a particular character.

6. The method of claim 5, further comprising the step of:
    determining the comparative effectiveness in reducing the number of words consistent with the current input resulting from selecting a particular character for different letter positions, and indicating to the user the most effective letter position.

7. The method of claim 1, wherein the word retrieved from memory that is most likely to be the desired word is displayed in a position in the menu closest to the nearest item comprising a plurality of letters.

8. The method of claim 1, wherein the ordered sequence of items is displayed in at least two vertical columns, with one column displaying at least some of the alphabetic input items, and the other column displaying at least one word retrieved from the memory.

9. The method of claim 1, wherein the word selected represents the address of an entity in a computer system.

10. The method of claim 1, wherein the word selected comprises an electronic mail address.

11. An apparatus for entering text into a computer system, comprising:
    a display for displaying an ordered sequence of items, wherein at least two of the items comprise an alphabetic input item, each alphabetic input item comprising two or more letters, thus allowing an ambiguous selection of one of the two or more letters, and in which one of the items in the ordered sequence is designated by displaying it in a manner different from the others;
    a cylinder that, when rotated, moves the designation of the item in the ordered sequence, with the force required for the movement of the rotating cylinder varying depending upon the relationship of the cylinder position with an item;
    a button that, when pressed, selects the alphabetic input item currently designated;
    a memory containing a list of words that can be entered into the computer system;
    a microprocessor connected to the display, cylinder, and button, the microprocessor adding the selected alphabetic input items to a sequence of selected alphabetic input items that ambiguously describe the beginning letters of a desired word, retrieve at least one word from memory based on the sequence of selected alphabetic input items, adding the at least one word retrieved from memory to the ordered sequence of items, and displaying the at least one word retrieved from memory.

12. The apparatus of claim 11, wherein the microprocessor accepts the selection of a menu item representing a particular character from the two or more characters.

13. The apparatus of claim 12, wherein the microprocessor removes those words from the ordered sequence of items that do not contain the particular character selected in the corresponding position.

14. The apparatus of claim 13, wherein the microprocessor determines the comparative effectiveness in reducing the number of words consistent with the current input resulting from selecting an additional ambiguous two or more characters as opposed to selecting a particular character.

15. The apparatus of claim 14, wherein the microprocessor indicates to the user the comparative effectiveness in reducing the number of words consistent with the current input resulting from selecting an additional ambiguous two or more characters as opposed to selecting a particular character.

16. The apparatus of claim 15, wherein the microprocessor determines the comparative effectiveness in reducing the number of words consistent with the current input resulting from selecting a particular character for different letter positions, and indicates to the user the most effective letter position.

17. The apparatus of claim 11, wherein the word retrieved from memory that is most likely to be the desired word is displayed in a position in the menu closest to the nearest item comprising a plurality of letters.

18. The apparatus of claim 11, wherein the ordered sequence of items is displayed in at least two vertical columns, with one column displaying at least some of the alphabetic input items, and the other column displaying at least one word retrieved from the memory.

19. The apparatus of claim 11, wherein the word selected represents the address of an entity in a computer system.

20. The apparatus of claim 11, wherein the word selected comprises an electronic mail address.

* * * * *